US012792795B2

(12) United States Patent
Yavari et al.

(10) Patent No.: US 12,792,795 B2
(45) Date of Patent: Nov. 10, 2026

(54) THERMAL MODELING OF ADDITIVE MANUFACTURING USING PROGRESSIVE HORIZONTAL SUBSECTIONS

(71) Applicant: NUtech Ventures, Lincoln, NE (US)

(72) Inventors: Reza Yavari, Lincoln, NE (US); Prahalada Rao, Lincoln, NE (US); Kevin D. Cole, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 1287 days.

(21) Appl. No.: 17/668,025

(22) Filed: Feb. 9, 2022

(65) Prior Publication Data

US 2022/0284154 A1 Sep. 8, 2022

Related U.S. Application Data

(60) Provisional application No. 63/147,674, filed on Feb. 9, 2021.

(51) Int. Cl.
*G06F 30/20* (2020.01)
*B33Y 10/00* (2015.01)
(Continued)

(52) U.S. Cl.
CPC .............. *G06F 30/20* (2020.01); *B33Y 50/00* (2014.12); *B33Y 10/00* (2014.12);
(Continued)

(58) Field of Classification Search
CPC ................. G06F 30/20; G06F 2119/08; G06F 2111/10; B33Y 50/00; B33Y 10/00
(Continued)

(56) References Cited

U.S. PATENT DOCUMENTS 10,409,932 B2 * 9/2019 Tang ..................... B29C 64/386
10,409,933 B2 * 9/2019 Komzisk ............... B29C 64/386
(Continued)

FOREIGN PATENT DOCUMENTS

WO WO 2014/074954 5/2014
WO WO 2016/133679 8/2016
WO WO 2020056388 3/2020

OTHER PUBLICATIONS

Jeong et al. (Thermal Analysis for Simulation of Metal Additive Manufacturing Process Considering Temperature- and History-Dependent Material Properties, International Journal of Aeronautical and Space Sciences (2021) pp. 52-63) (Year: 2021).*
(Continued)

*Primary Examiner* — Iftekhar A Khan
(74) *Attorney, Agent, or Firm* — Fish & Richardson P.C.

(57) ABSTRACT

Systems for simulating temperature during an additive manufacturing process. A system can access a computer-modelled part representing a physical part, populate first nodes within a first region of the part with temperature values, the first region having a first density of the first nodes, populate second nodes within a second region of the part with temperature values, the second region having a second density of the second nodes less than the first density of the first nodes and being distal the surface of the part where material is added, remove first nodes from part of the first region proximate the second region, simulate adding material on the surface of the part to form a new layer, the new layer being part of the first region and having first nodes distributed according to the first density, and populate the first nodes within the new layer of the part with temperature values.

20 Claims, 23 Drawing Sheets
(18 of 23 Drawing Sheet(s) Filed in Color)

(51) Int. Cl.
*B33Y 50/00* (2015.01)
*G06F 111/10* (2020.01)
*G06F 113/10* (2020.01)
*G06F 119/08* (2020.01)

(52) U.S. Cl.
CPC ....... *G06F 2111/10* (2020.01); *G06F 2113/10* (2020.01); *G06F 2119/08* (2020.01)

(58) Field of Classification Search
USPC .............................................................. 703/6
See application file for complete search history.

(56) References Cited

U.S. PATENT DOCUMENTS

| | | | | |
|---|---|---|---|---|
| 10,525,630 | B2 * | 1/2020 | Nguyen | B22F 10/25 |
| 11,188,690 | B1 * | 11/2021 | Pal | G06F 30/398 |
| 11,620,421 | B2 * | 4/2023 | Wang | B29C 64/153 700/98 |
| 2004/0249809 | A1 * | 12/2004 | Ramani | G06F 16/5854 |
| 2011/0074936 | A1 | 3/2011 | Gavrilenco | |
| 2012/0206605 | A1 | 8/2012 | Buehler et al. | |
| 2013/0124150 | A1 * | 5/2013 | Kim | G06F 30/15 703/1 |
| 2015/0352794 | A1 * | 12/2015 | Nguyen | B22F 10/25 700/98 |
| 2016/0086376 | A1 * | 3/2016 | Tang | B29C 64/386 345/420 |
| 2016/0136896 | A1 * | 5/2016 | Wighton | B33Y 50/00 700/120 |
| 2016/0321384 | A1 * | 11/2016 | Pal | B33Y 50/02 |
| 2017/0212979 | A1 * | 7/2017 | Cheng | G06F 30/17 |
| 2017/0337307 | A1 * | 11/2017 | Oancea | B22F 10/20 |
| 2020/0096970 | A1 * | 3/2020 | Mehr | G05B 19/4099 |
| 2020/0150624 | A1 * | 5/2020 | Marinov | G06T 17/20 |
| 2020/0198230 | A1 * | 6/2020 | Lo | B33Y 50/02 |
| 2021/0080930 | A1 * | 3/2021 | Hamaguchi | B22F 10/80 |
| 2021/0379832 | A1 * | 12/2021 | Orend | B22F 10/28 |
| 2022/0058315 | A1 * | 2/2022 | Yavari | B33Y 50/00 |
| 2022/0114307 | A1 * | 4/2022 | Severson | B33Y 99/00 |
| 2022/0266531 | A1 * | 8/2022 | Storck | B22F 10/20 |

OTHER PUBLICATIONS

[No Author Listed], "ASTM ISO/ASTM52910-17 Standard Guidelines for Design for Additive Manufacturing," ASTM International, 2016, West Conshohocken, PA, 14 pages.
Cole et al., "Computational heat transfer with spectral graph theory: Quantitative verification," International Journal of Thermal Sciences, Jul. 2020, 153:106383, 15 pages.
Denlinger et al., "Effect of inter-layer dwell time on distortion and residual stress in additive manufacturing of titanium and nickel alloys," Journal of Materials Processing Technology, 2015, 215:123-131.
Denlinger et al., "Thermomechanical model development and in situ experimental validation of the Laser Powder-Bed Fusion process," Additive Manufacturing, Accepted Manuscript, 2017, 16:73-80, 29 pages.
Denlinger et al., "Thermomechanical modeling of additive manufacturing large parts," J. Manuf. Sci. Eng., 2014, 136(6):061007-1-061007-8.
Dunbar et al., "Comparisons of laser powder bed fusion additive manufacturing builds through experimental in situ distortion and temperature measurements," Additive Manufacturing, Accepted Manuscript, 2017, 15:57-65, 21 pages.
Escolano et al., "Heat diffusion: Thermodynamic depth complexity of networks," Physical Review E, 2012, 85(3):036206, 15 pages.
Francois et al., "Modeling of additive manufacturing processes for metals: Challenges and opportunities," Current Opinion in Solid State and Materials Science, 2017, 21(4):198-206.
Ganeriwala et al., "Multiphysics modeling and simulation of selective laser sintering manufacturing processes," Procedia CIRP, 2014, 14:299-304.
Goldak et al., "A New Finite Element Model for Welding Heat Sources," Metallurgical Transactions B, 1984, 15:299-305.
Goldak et al., "Computer Simulation of Welding Processes," Computational Welding Mechanics, 2005, 16-69.
Gouge et al., "Modeling forced convection in the thermal simulation of laser cladding processes," The International Journal of AdvancedManufacturing Technology, Feb. 4, 2015, 79:307-320.
Heigel et al., "Thermomechanical model development and validation of directed energy deposition additive manufacturing of Ti—6A1—4V," Additive Manufacturing, Jan. 2015, 5:9-19, 46 pages.
Heigel, "Thermo-Mechanical Model Development and Experimental Validation for Directed Energy Deposition Additive Manufacturing Processes," Thesis for the degree of Doctor of Philosophy, Pennsylvania State University, Mechanical Engineering, May 2015, 216 pages.
Khairallah et al., "Laser powder-bed fusion additive manufacturing: physics of complex melt flow and formation mechanisms of pores, spatter, and denudation zones," Acta Materialia, 2016, 108:36-45.
King et al., "Laser powder bed fusion additive manufacturing of metals; physics, computational, and materials challenges," Appl. Phys. Rev., 2015, 2(4):041304, 27 pages.
King et al., "Overview of modelling and simulation of metal powder-bed fusion process at Lawrence Livermore National Laboratory," Materials Science and Technology, 2014, 31(8):957-968.
Lee et al., "Mesoscopic simulation of heat transfer and fluid flow in laser powder bed additive manufacturing." International Solid Free Form Fabrication Symposium, 2015, 1154-1165.
Martukanitz et al., "Toward an integrated computational system for describing the additive manufacturing process for metallic materials," Additive Manufacturing, 2014, 1:52-63.
Michaleris, "Modeling metal deposition in heat transfer analyses of additive manufacturing processes," Finite Elements in Analysis and Design, 2014, 86:51-60.
Oterkus et al., "Peridynamic thermal diffusion," Journal of Computational Physics, 2014, 265:71-96.
PCT International Preliminary Report on Patentability in International Appln. No. PCT/US2019/051192, dated Mar. 25, 2021, 10 pages.
PCT International Search Report and Written Opinion in International Appln. No. PCT/US2019/051192, dated Nov. 25, 2019, 12 pages.
Raghavan et al., "Numerical modeling of heat-transfer and the influence of process parameters on tailoring the grain morphology of IN718 in electron beam additive manufacturing," Acta Materialia, 2016, 112:303-314.
Romer "Matlab Laser Toolbox User Manual," University of Twente, Enschede, Netherlands, Sep. 23, 2010, 19 pages.
Romer "Matlab Laser Toolbox," Physics Procedia, Dec. 2010, 5:413-419.
Rosen, "Computer-aided design for additive manufacturing of cellular structures," Computer-Aided Design and Applications, 2007, 4(5):585-594.
Rosen, "Design for additive manufacturing: Past, present, and future directions," Journal of Mechanical Design, 2014, 136(9):090301, 2 pages.
Schoinochoritis et al., "Simulation of metallic powder bed additive manufacturing processes with the finite element method: A critical review," Proc IMechE Part B: J Engineering Manufacture, 2015, 231(1):96-117.
Silling et al., "A meshfree method based on the peridynamic model of solid mechanics," Computers and Structures, 2005, 83:1526-1535.
Sun et al., "Spectral Collocation Method for Transient Conduction-Radiation Heat Transfer," Journal of Thermophysics and Heat Transfer, 2010, 24(4):823-832.
Wang et al., "Topological design and additive manufacturing of porous metals for bone scaffolds and orthopaedic implants: a review," Biomaterials, 2016, 83:127-141.
Xiao et al., "Graph characteristics from the heat kernel trace," Pattern Recognition, 2009, 42(11):2589-2606.

(56) References Cited

OTHER PUBLICATIONS

Yan et al., "Review on thermal analysis in laser-based additive manufacturing," Optics & Laser Technology, Oct. 2018, 106:427-441.
Yang et al., "Design for Additive Manufacturing," Additive Manufacturing of Metals: The Technology, Materials, Design and Production, 2017, Springer, pp. 81-160.
Yavari et al., "Design Rules for Additive Manufacturing—Understanding the Fundamental Thermal Phenomena to Reduce Scrap," Procedia Manufacturing, 2019, 33:375-382.
Yavari et al., "Predicting Part-Level Thermal History in Metal Additive Manufacturing Using Graph Theory: Experimental Validation With Directed Energy Deposition of Titanium Alloy Parts," Presented at ASME 2019 14th International Manufacturing Science and Engineering Conference, Erie, PA, USA, Jun. 10-14, 2019, 7 pages.
Yavari et al., "Thermal Modeling in Metal Additive Manufacturing using Graph Theory," Journal of Manufacturing Science and Engineering, Jul. 2019, 141(7):071007, 20 pages.
Ye et al., "Numerical Modeling of Metal-Based Additive Manufacturing Using Level Set Methods," Journal of Manufacturing Science and Engineering, 2017, 139(7):071019-1-071019-8.
Zhang et al., "Graph spectral image smoothing using the heat kernel," Pattern Recognition, 2008, 41(11):3328-3342.

* cited by examiner

FIG. 7A
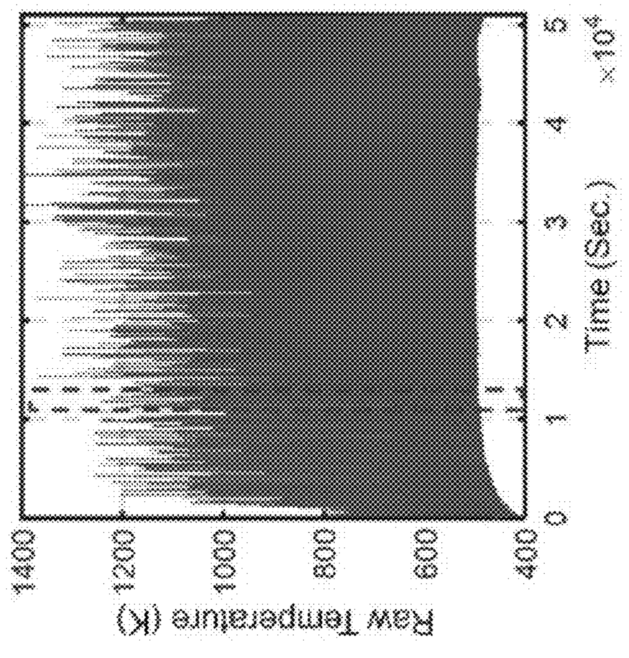
FIG. 7B
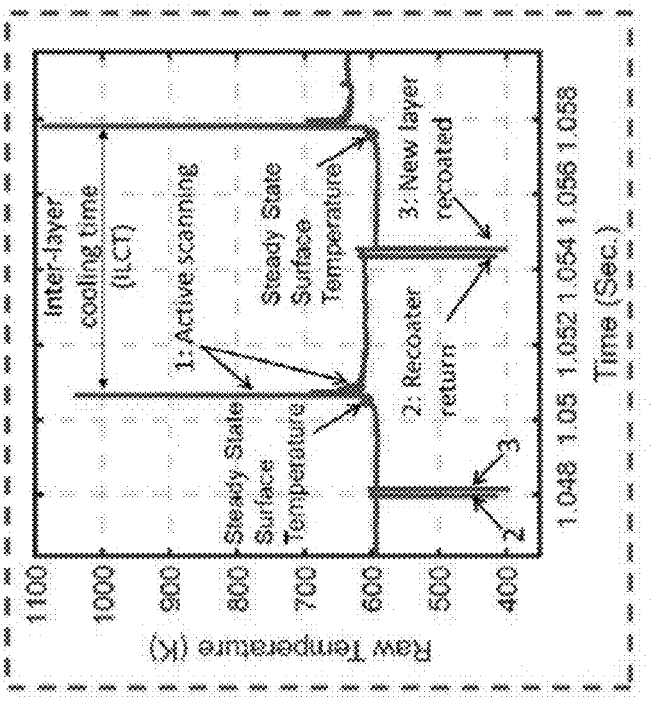
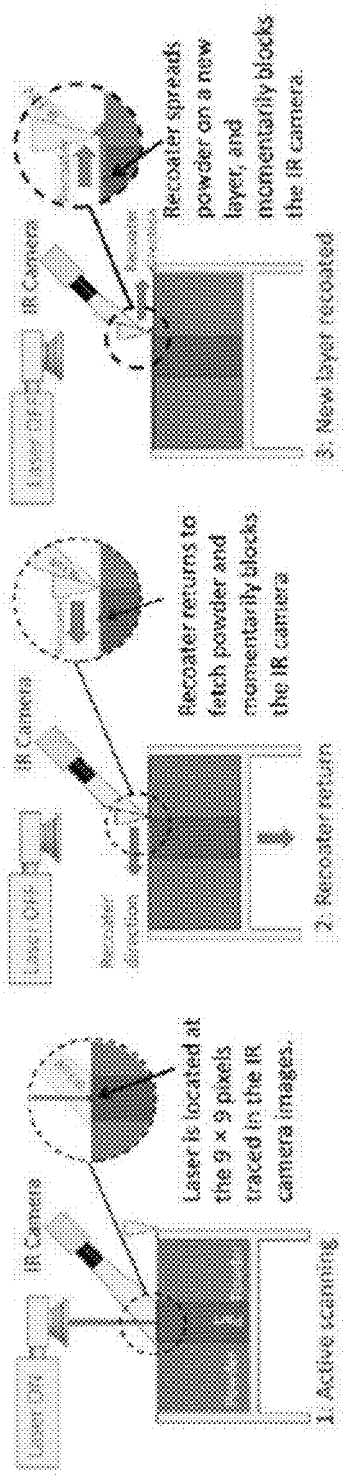
FIG. 7C

THERMAL MODELING OF ADDITIVE MANUFACTURING USING PROGRESSIVE HORIZONTAL SUBSECTIONS

CROSS-REFERENCE TO RELATED APPLICATION

This application claims the benefit of the filing date of U.S. Provisional Application No. 63/147,674, filed on Feb. 9, 2021. The contents of U.S. Application No. 63/147,674 are incorporated herein by reference in their entirety.

FEDERALLY SPONSORED RESEARCH OR DEVELOPMENT

This invention was made with government support under Grant No. CMMI1752069 awarded by the U.S. National Science Foundation. The government has certain rights in the invention.

TECHNICAL FIELD

This disclosure relates to simulating additive manufacturing processes.

BACKGROUND

Additive manufacturing (e.g., three-dimensional printing) is a process in which layers of material are sequentially applied and fused together. Inadequate heat dissipation can lead to failure of additive manufactured parts.

Metal additive manufacturing (AM/3D printing) offers unparalleled advantages over conventional manufacturing, including greater design freedom and a lower lead time. However, the use of AM parts in safety-critical industries, such as aerospace and biomedical, is limited by the tendency of the process to create flaws that can lead to sudden failure during use. The root cause of flaw formation in metal AM parts, such as porosity and deformation, is linked to the temperature inside the part during the process, called the thermal history. The thermal history is a function of the process parameters and part design.

Consequently, the first step towards ensuring consistent part quality in metal AM is to understand how and why the process parameters and part geometry influence the thermal history. Given the current lack of scientific insight into the causal design-process-thermal physics link that governs part quality, AM practitioners resort to expensive and time-consuming trial-and-error tests to optimize part geometry and process parameters.

An approach to reduce extensive empirical testing is to identify the viable process parameters and part geometry combinations through rapid thermal simulations. However, a major barrier that deters physics-based design and process optimization efforts in AM is the prohibitive computational burden of existing thermal modeling.

SUMMARY

The present disclosure is directed to a novel graph theory-based computational thermal modeling approach for predicting the thermal history of titanium alloy or other metal parts made using the directed energy deposition metal AM process or laser powder bed fusion (LPBF). For instance, the disclosure can provide for mesh-free, fast thermal modeling of LPBF parts using graph theory. One or more computational strategies presented herein can be used to scale the graph theory approach for predicting thermal history of large and complex-shaped LPBF parts.

As an illustrative example, the graph theory thermal modeling approach described herein was tested with LPBF-processed stainless steel (SAE 316L) impeller having outside diameter 155 mm and vertical height 35 mm (700 layers). The impeller was processed on a Renishaw AM250 LPBF system and took 16 hours to complete. During the process, in-situ layer-by-layer steady state surface temperature measurements for the impeller were obtained using a calibrated longwave infrared thermal camera. As an example of the outcome, on implementing any of the strategies disclosed herein, which did not reduce or simplify the part geometry, the thermal history of the impeller was predicted with approximate mean absolute error of 6% (standard deviation 0.8%) and root mean square error 23 K (standard deviation 3.7 K). Moreover, the thermal history was simulated within 40 minutes using desktop computing, which is less than the 16 hours required to build.

In addition to the embodiments of the attached claims and the embodiments described above, the following numbered embodiments can also be innovative.

Embodiment 1 is a computer-implemented method for simulating temperature during an additive manufacturing process, the method comprising accessing, by a computing system, a computer-modelled part representing a physical part to be formed using an additive manufacturing process; populating, by the computing system, first nodes within a first region of the computer-modelled part with temperature values, such that each of the first nodes has a corresponding temperature value, the first region of the computer-modelled part having a first density of the first nodes, the first region of the computer-modelled part being proximal a surface of the computer-modelled part at which material is added to the computer-modelled part during a simulation of the additive manufacturing process; populating, by the computing system, second nodes within a second region of the computer-modelled part with temperature values, such that each of the second nodes has a corresponding temperature value, the second region of the computer-modelled part having a second density of the second nodes that is less than the first density of the first nodes in the first region of the computer-modelled part, the second region of the computer-modelled part being distal the surface of the computer-modelled part at which material is added to the computer-modelled part during the simulation of the additive manufacturing process; removing, by the computing system, first nodes from part of the first region that is proximate the second region, so that the part of the first region that is proximate the second region becomes part of the second region and has the second density of nodes; simulating, by the computing system as part of the simulation of the additive manufacturing process, adding material on the surface of the computer-modelled part to form a new layer of the computer-modelled part, the new layer of the computer-modelled part being part of the first region and having first nodes that are distributed according to the first density; and populating, by the computing system, the first nodes within the new layer of the computer-modelled part with temperature values, such that each of the first nodes within the new layer of the computer-modelled part has a corresponding temperature value.

Embodiment 2 is the method of embodiment 1, wherein the first nodes are populated with temperature values within the first region of the computer-modelled part concurrently with the second nodes being populated with temperature values within the second region of the computer-modelled part, while the computer-modelled part is partially formed during the simulation of the additive manufacturing process.

Embodiment 3 is the method of any one of embodiments 1-2, wherein removing the first nodes from the part of the first region that is proximate the second region frees computer memory that enables the computing system to perform the populating of the first nodes within the new layer of the computer-modelled part with temperature values.

Embodiment 4 is the method of any one of embodiments 1-3, wherein each of the first nodes within the first region of the computer-modelled part is connected to multiple other nodes with respective edges to form a first network of nodes; and each of the second nodes within the second region of the computer-modelled part is connected to multiple other nodes with respective edges to form a second network of nodes.

Embodiment 5 is the method of embodiment 4, comprising: propagating, by the computing system as part of the simulation of the additive manufacturing process, temperature among the first nodes of the first network of nodes by way of edges between various of the first nodes; and propagating, by the computing system as part of the simulation of the additive manufacturing process, temperature among the second nodes of the second network of nodes by way of edges between various of the second nodes.

Embodiment 6 is the method of embodiment 4, wherein the first network of nodes is provided by a first computer model that models only part of the computer-modelled part that has the first density of first nodes; and the second network of nodes is provided by a second computer model that models all of the computer-modelled part with the second density of second nodes.

Embodiment 7 is the method of embodiment 6, wherein the first network of nodes is unconnected to the second network of second nodes by edges; and the computing system updates temperature values for first nodes in the first region that are proximal a boundary between the first region and the second region based on temperature values for second nodes in the second region that are proximal the boundary between the first region and the second region.

Embodiment 8 is the method of any one of embodiments 1-7, wherein the additive manufacturing process comprises a laser powder bed fusion additive manufacturing process.

Embodiment 9 is the method of any one of embodiment 1-8, wherein the first region of the computer-modelled part that has the first density of the first nodes comprises multiple first layers of the computer-modelled part that were progressively added to the computer-modelled part by the simulation of the additive manufacturing process; and the second region of the computer-modelled part that has the second density of the second nodes comprises multiple second layers of the computer-modelled part that were progressively added to the computer-modelled part by the simulation of the additive manufacturing process.

Embodiment 10 is the method of any one of embodiments 1-9, wherein the first region of the computer-modelled part comprises a first horizontal section of the computer-modelled part that is proximal the surface of the computer-modelled part at which material is added to the computer-modelled part; and the second region of the computer-modelled part comprises a second horizontal section of the computer-modelled part distal the surface of the computer-modelled part at which material is added to the computer-modelled part.

Embodiment 11 is the method of embodiment 10, wherein the first horizontal section of the computer-modelled part is adjacent the second horizontal section of the computer-modelled part.

Embodiment 12 is the method of any one of embodiments 1-11, comprising: simulating, by the computing system as part of the simulation of the additive manufacturing process, adding material to form an initial layer of the computer-modelled part on a build plate and multiple additional layers progressively added on the initial layer; populating, by the computing system, first nodes within the initial layer and the multiple additional layers of the computer-modelled part with temperature values, the first nodes within the initial layer and the multiple additional layers of the computer-modelled part being distributed according to the first density, wherein the computer-modelled part has no second region with second nodes that have the second density and are populated with temperature values while the computer-modelled part has only the initial layer and the multiple additional layers; and removing, by the computing system, first nodes that are distributed through at least part of the initial layer and the multiple additional layers to form the second region that has the second density that is lower than the first density.

Embodiment 13 is the method of embodiment 12, wherein the computing system is configured to not remove first nodes from the first region until the computing system has simulated adding material to progressively form multiple layers on top of the initial layer of the computer-modelled part.

Embodiment 14 is the method of any one of embodiments 1-13, comprising: simulating, by the computing system, an addition of heat energy to first nodes of the computer-modelled part that are proximal the surface of the computer-modelled part during the simulation of the additive manufacturing process, due to simulated process energy added at or near the surface of the computer-modelled part.

Embodiment 15 is the method of embodiment 14, wherein first nodes proximal the surface of the computer-modelled part have highest temperature values among first nodes and second nodes of the computer-modelled part.

Embodiment 16 is the method of any one of embodiments 1-3 and 8-16, wherein removing the first nodes from the part of the first region that is proximate the second region comprises removing temperature values and computations associated with the removed first nodes and leaving information that identifies the removed first nodes.

Embodiment 17 is a computerized system, comprising: one or more processors; and one or more computer-readable devices including instructions that, when executed by the one or more processors, cause the computerized system to perform the method of any one of the embodiments 1-16.

Embodiment 18 is a computer-implemented method for simulating temperature during an additive manufacturing process, the method comprising: accessing, by a computing system, a computer-modelled part representing a physical part to be formed using an additive manufacturing process; at an initial stage of a simulation of the additive manufacturing process: simulating, by the computing system as part of the simulation of the additive manufacturing process, adding material to form an initial layer of the computer-modelled part on a build plate and multiple additional layers progressively added on the initial layer; and populating, by the computing system, first nodes within the initial layer and the multiple additional layers of the computer-modelled part with temperature values, such that each of the first nodes within the initial layer and the multiple additional layers has a corresponding temperature value, the first nodes within the initial layer and the multiple additional layers of the computer-modelled part being distributed according to a first density of the first nodes, wherein the computer-modelled part has no region with second nodes that have a second density lower than the first density and that are populated with temperature values while the computer-modelled part has only the initial layer and the multiple additional layers, the second density of the second nodes being lower than the first density of the first nodes; removing, by the computing system, first nodes that are distributed through at least part of the initial layer and the multiple additional layers to form a second region that is proximate the build plate and that has the second density that is lower than the first density; and at a later stage of the simulation of the additive manufacturing process: populating, by the computing system, first nodes within a first region of the computer-modelled part with temperature values, such that each of the first nodes within the first region has a corresponding temperature value, the first region of the computer-modelled part having the first density of the first nodes, the first region of the computer-modelled part being proximal a surface of the computer-modelled part at which material is added to the computer-modelled part during the simulation of the additive manufacturing process, each of the first nodes within the first region of the computer-modelled part being connected to multiple other nodes with respective edges to form a first network of nodes; populating, by the computing system, second nodes within the second region of the computer-modelled part with temperature values, such that each of the second nodes within the second region has a corresponding temperature value, the second region of the computer-modelled part having the second density of the second nodes that is less than the first density of the first nodes in the first region of the computer-modelled part, the second region of the computer-modelled part being distal the surface of the computer-modelled part at which material is added to the computer-modelled part during the simulation of the additive manufacturing process, each of the second nodes within the second region of the computer-modelled part being connected to multiple other nodes with respective edges to form a second network of nodes; removing, by the computing system, first nodes from part of the first region that is proximate the second region, so that the part of the first region that is proximate the second region becomes part of the second region and has the second density of nodes; simulating, by the computing system as part of the simulation of the additive manufacturing process, adding material on the surface of the computer-modelled part to form a new layer of the computer-modelled part, the new layer of the computer-modelled part being part of the first region and having first nodes that are distributed according to the first density; and populating, by the computing system, the first nodes within the new layer of the computer-modelled part with temperature values, such that each of the first nodes within the new layer of the computer-modelled part has a corresponding temperature value, wherein removing the first nodes from the part of the first region that is proximate the second region free computer memory that enables the computing system to perform the populating of the first nodes within the new layer of the computer-modelled part with temperature values.

Advantageously, the described systems and techniques may provide for one or more benefits, such as computationally efficient yet highly accurate computer simulations of heat distribution in AM parts formed by directed energy deposition (DED). The disclosed systems and techniques can also be advantageous to free up computer memory for further processing of layers of a part. Processing the part may require significant computing power. The more computing power and memory that is used, the slower it can take to process the part. The disclosed techniques, for example, provide for removing or erasing high density nodes in layers of the part to free up computer memory for additional layer processing. Removing or erasing the high density nodes can include erasing from memory all computations, algorithms, mathematical equations, and information associated with those high density nodes. Once that information is erased from memory, the computing system can continue adding and processing layers of the part without experiencing significant delays in runtime speed or processing capabilities.

The disclosed systems and techniques can also provide for reducing empirical testing. Expensive trial-and-error testing can be reduced in optimization of processing parameters, part features, placement of supports, and build conditions. The disclosure can also provide for monitoring and controlling in-process quality. In-situ sensors can be augmented to validate model predictions with in-situ measurements. The disclosure also provides for a rapid and computationally inexpensive approach since the graph theory approach can eliminate tedious meshing steps of finite element (FE) analysis and matrix inversion. As described above, the disclosure can provide for reducing a computation burden for complicated parts. Finally, the disclosure can provide for using more nodes to fill more small areas of a part, which can lead to higher accuracy in computations and part building.

The details of one or more implementations are set forth in the accompanying drawings and the description below. Other features, objects, and advantages will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

FIG. 7A is a graphical depiction of raw surface temperature for the region sampled in FIG. 5.

FIG. 7B is a graphical depiction of the zoomed in region from FIG. 7A showing a measurement of steady state surface temperature just before a laser fuses a new layer.

FIG. 7C illustrates a rationale for various signatures observed in the raw temperature signature of FIG. 7B.

Like reference symbols in the various drawings indicate like elements.

DETAILED DESCRIPTION

Figure 1:
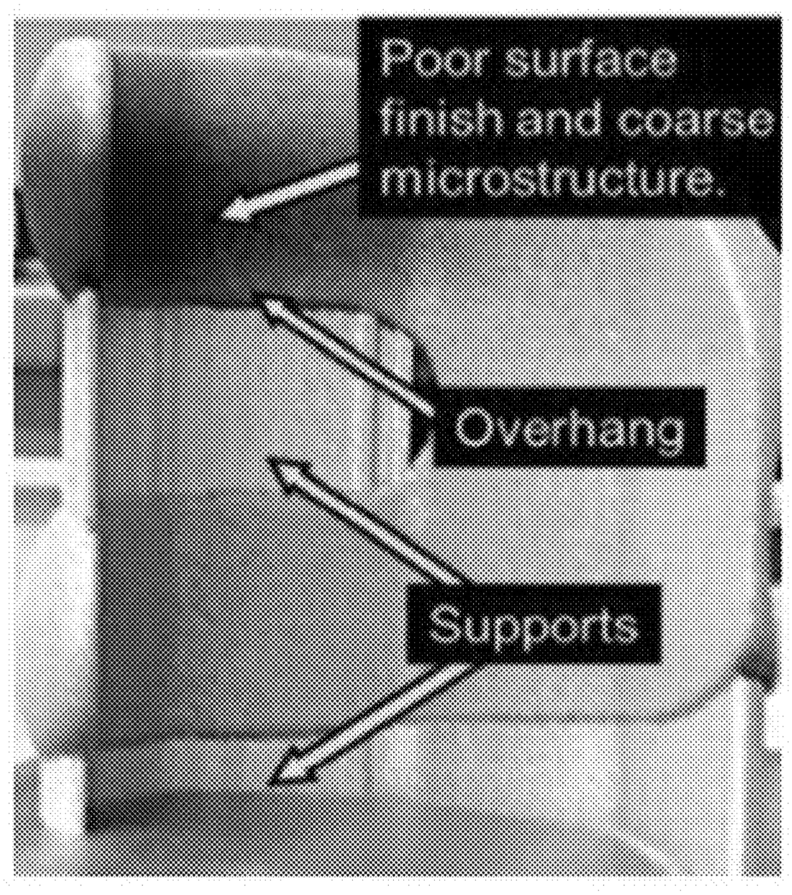
FIG. 1 illustrates an example structure made with an LPBF process described herein.

In laser powder bed fusion (LPBF) process, thin layers of powder material can be raked or rolled on a platen (powder bed) and selectively melted layer-upon-layer using a laser to form a three-dimensional part. An advantage of the LPBF process is that it can reduce multiple sub-components to a single part due to its ability to create complex features, such as conformal cooling channels, which are difficult to achieve with traditional subtractive and formative processes. The fewer number of parts leads to reduction in both weight and production costs.

Despite its potential to overcome design and processing barriers of traditional subtractive and formative manufacturing techniques, the use of LPBF metal additive manufacturing may be limited by deformation, porosity and inconsistencies in microstructure, which can be linked to spatiotemporal temperature distribution in the part during the process. Depending on its shape, certain regions of a part may retain heat or cool more slowly compared to other regions of the part. This uneven heating and cooling of the part can cause flawed formation in typical LPBF, such as non-uniformity of microstructure, deformation, and cracking. The temperature distribution, also called thermal history, is a function of several factors encompassing material properties, part geometry and orientation (e.g., shape), processing parameters, placement of supports, and build plan (e.g., layout). The broad range of factors can be difficult and/or expensive to optimize through empirical testing alone. Consequently, fast and accurate models to predict the thermal history are valuable for mitigating flaw formation in LPBF-processed parts.

To obtain the thermal history, a heat diffusion equation is solved. Solving the heat diffusion equation can be challenging in the additive manufacturing context, including LPBF, because, the shape of the part (object) may not be static, but that shape can change as material is continually added layer-upon-layer. Consequently, for thermal simulation concerning a metal additive manufacturing process, the part geometry can be repeatedly re-meshed. In other words, the computational domain of finite element (FE)-based models in AM changes after each time step. The re-meshing interval can range from the individual hatch-level to deposition of multiple layers at once, depending upon the desired resolution. This re-meshing can be computationally demanding and time-consuming as it is necessary to label and track the location of each FE node. Two existing approaches can be used to simulate deposition of material in FE analysis: element birth-and-death method and quiet element method. A hybrid method can also be used in some commercial software. To further speed computation, these meshing strategies can be combined with a dynamic technique called adaptive meshing. In adaptive meshing, the element size may not be fixed and can change continually during simulation. as the simulation progresses layer by layer, the element size can be made larger (e.g., the mesh can be made coarse) for regions of the part that have a large cross-section, whereas regions near the boundary of the part and those with intricate features can have a finer mesh. To speed computation, commercial packages may use proprietary techniques to implement adaptive meshing. Additionally, in FE methods, the continuum heat diffusion equation can be solved for each element, which can require matrix inversion. This can place further computational demands on the overall process. Graph theory, as described herein, can provide one or more computational advantages over FE analysis. For example, the graph theory approach can be mesh-free. As another example, the graph theory approach can solve a discrete version of the heat diffusion equation that replaces matrix inversion with matrix transpose.

To improve part quality, AM practitioners may traditionally resort to expensive, multi-stage empirical tests to optimize processing parameters, finalize the part design, suggest the location and orientation of parts on the build plate, and ascertain placement of anchoring supports. For example, the effect of parameters, such as the laser power and velocity on microstructure and porosity have been quantified in existing work. These optimal parameter sets were developed in the context of single-track scans, and simple shapes—typically prismatic coupons and so-called dogbone geometries—due to their tractability for post-process materials characterization and mechanical. However, process parameters optimized for one type of geometry may not lead to a flaw-free part when used for different part geometries and orientations.

Resorting to a purely empirical optimization approach can be expensive and time consuming in LPBF given the cost of the powder, relative slow speed of the process, and limited number of samples available for testing. Accordingly, fast and accurate models to predict the temperature distribution in LPBF parts can be valuable in the following contexts three contexts. First, improved models, as described herein, can reduce empirical testing needed for optimization of processing parameters, part features, placement of supports, and build conditions. Second, improved models can augment in-situ sensor data for process monitoring and control.

Third, improved models can predict residual stresses, microstructure evolved, and mechanical properties.

Existing commercial packages can use FE analysis to predict temperature distribution. While such commercial packages can predict the temperature distribution within a time to build the part, the implementation and physical approximations incorporated within these commercial software packages remain proprietary and accuracy of their predictions remain to be independently validated. Although non-proprietary FE-based thermal models of the LPBF process have been published and validated, a gap in these efforts is that the thermal history predictions are made in the context of simple prismatic shapes with low thermal mass. A second drawback is that the non-proprietary simulations often may require longer to converge than the actual time to build the part, mainly due to bottlenecks concerned with FE-mesh generation. Therefore, the disclosed techniques can be used to develop more computationally efficient thermal models to predict the temperature distribution in large volume, complex shaped LPBF parts, and subsequently, quantify the prediction accuracy with in-situ measurements.

In some implementations, a graph theory-based approach for predicting the temperature distribution in LPBF parts can be used. Using this mesh-free approach, generated thermal history predictions converged within 30% to 50% of the time of non-proprietary finite element analysis for a similar level of prediction error. This graph theory approach can be scaled, as described herein, to predict the thermal history of large volume, complex geometry LPBF parts. To realize this objective, three computational strategies can be used in an illustrative example to predict the thermal history of a stainless steel (SAE 316L) impeller having outside diameter 155 mm and vertical height 35 mm (700 layers). In this example, the impeller was processed on a Renishaw AM250 LPBF system and required 16 hours to complete. During the process, in-situ layer-by-layer steady state surface temperature measurements for the impeller were obtained using a calibrated longwave infrared camera. As an example of the outcome, on implementing one of the three strategies described herein, which did not reduce or simplify the part geometry, the thermal history of the impeller was predicted with approximate mean absolute error of 6% and root mean square error 23 K. Moreover, the thermal history was simulated on a desktop computer within 40 minutes, which is considerably less than the 16 hours required to build the impeller part.

The graph theory approach was verified with an FE-based implementation of Goldak's double ellipsoid thermal model. The graph theory-derived predictions were qualitatively compared with a commercial package (Netfabb by Autodesk). Precision of the temperature trends predicted by graph theory approach was verified with Green's function-based exact analytical solutions, finite element and finite difference methods for a variety of one- and three-dimensional benchmark heat transfer problems. The graph theory approach was experimentally validated with surface temperature measurements obtained using an in-situ longwave infrared thermal camera for two LPBF parts, specifically, a cylinder (Φ10 mm×60 mm vertical height) and a cone-shaped part (Φ10 mm×20 mm vertical height). Additionally, both the graph theory and finite element-derived thermal history predictions were compared with experimental temperature measurements. As an example, for the cylinder-shaped test part, the graph theory approach predicted the surface temperature trends to within 10% mean absolute percentage error and 16 K root mean squared error compared to experimental measurements. Furthermore, the graph theory-based temperature predictions were made in less than 65 min, substantially faster than the actual time of 171 minutes required to build the cylinder. In comparison, for an identical level of resolution and prediction error, the non-proprietary FE-based approach required over 175 minutes.

The disclosed techniques can be used to scale the graph theory approach mentioned above to predict the thermal history of large-volume and complex-shaped LPBF parts. Three strategies, as described in reference to FIGS. 9, 11, and 12 can be employed to scale the graph theory approach.

Referring to the figures, FIG. 1 illustrates an example structure made with an LPBF process described herein. Consequential effect of part design on the temperature distribution, and ultimately on part quality, is depicted in FIG. 1, which shows a stainless steel knee implant built on a commercial-grade LPBF machine. The knee implant has a steep overhang region, e.g., a part feature where the underside is devoid of material and thus requires anchoring supports to prevent collapse. Although the knee implant was processed under manufacturer-recommended settings, the overhang region was found to have a coarse-grained microstructure and poor surface quality. These flaws can result from heat being constrained in the overhang region due to the poor thermal conductivity of the un-melted powder underneath the overhang section and narrow cross-section of the supports can impede heat flow. The heat constrained in the overhang region, in turn, can lead to microstructure heterogeneity and degraded surface quality.

Figure 2:
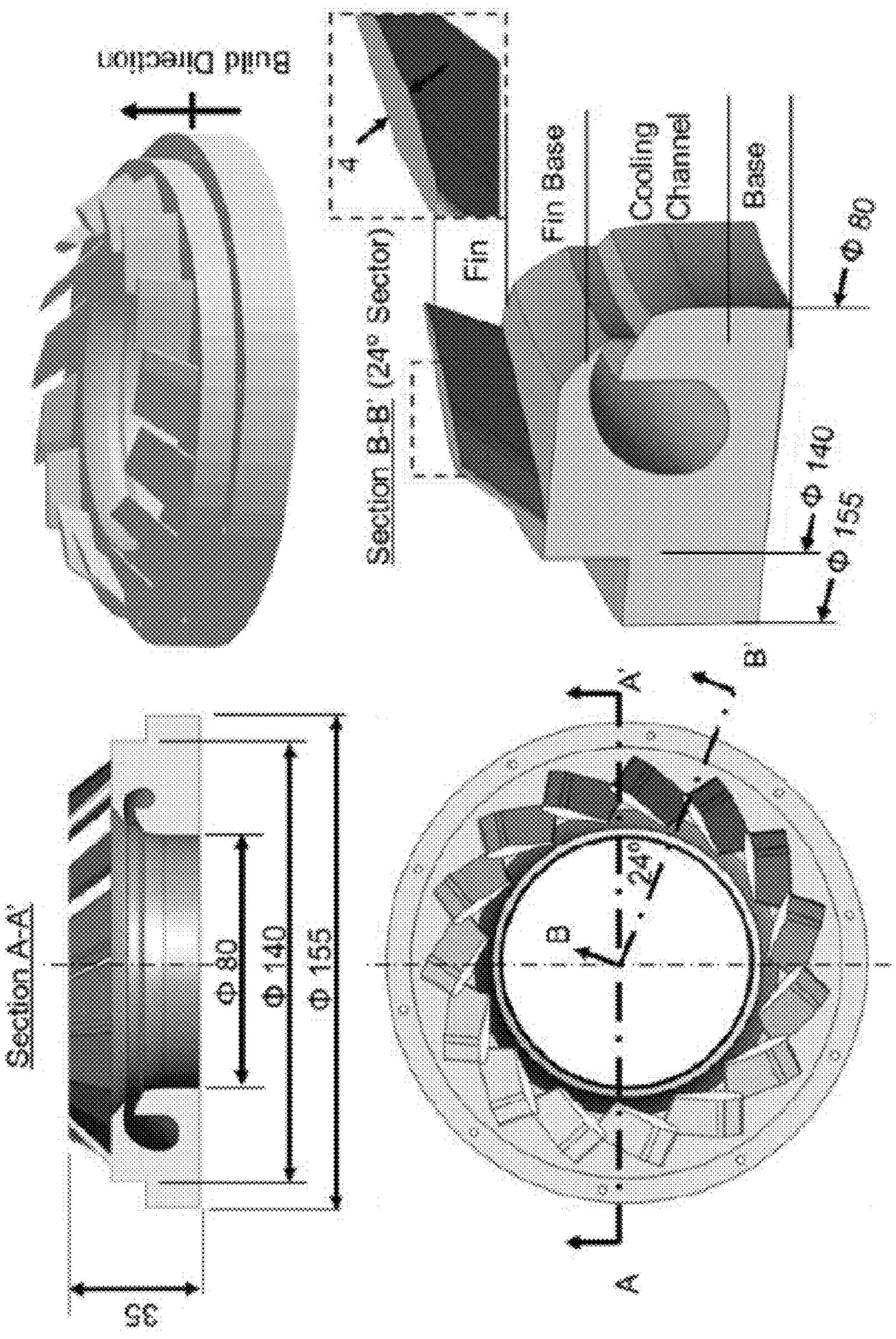
FIG. 2 depicts a schematic of an illustrative example impeller part used for testing the disclosed techniques.

FIG. 2 depicts a schematic of an illustrative example impeller part used for testing the disclosed techniques. The impeller depicted in FIG. 2 is used and described with regards to the following disclosure. The illustrative example test part used and described herein is a stainless steel (SAE 316L) impeller. This part was processed on a commercial LPBF system (Renishaw AM250). The impeller had an outside diameter approximately 155 mm, vertical height 35 mm (250 $cm^3$ volume), and consisted of 700 layers (50 μm layer thickness). The impeller had a spiraling internal channel, and 15 thin-walled fin-like structures each of 4 mm width. The build time was close to 16 hours. The steady state surface temperature for each layer of the impeller was recorded using an in-situ thermal camera. The steady state surface temperature can be obtained after a layer of powder is deposited. The steady state surface temperature can be the end-of-cycle temperature after a fresh layer is deposited, but before the layer is melted by the laser.

Using one of the computational approaches described herein, the thermal history of the impeller was simulated within 40 minutes compared to 16 hours build time while maintaining the prediction error ~6% (mean absolute percentage error) and within 25 K (root mean squared error) of the experimental data. The standard deviation can be 0.8% and 3.7 K respectively. The part geometry was not scaled to make it simpler or smaller, and the simulations were conducted on a desktop computer in a MATLAB environment. In some implementations, the simulations can be conducted in one or more other computing environments and/or on one or more other computing systems, devices, and/or servers.

Figure 3:
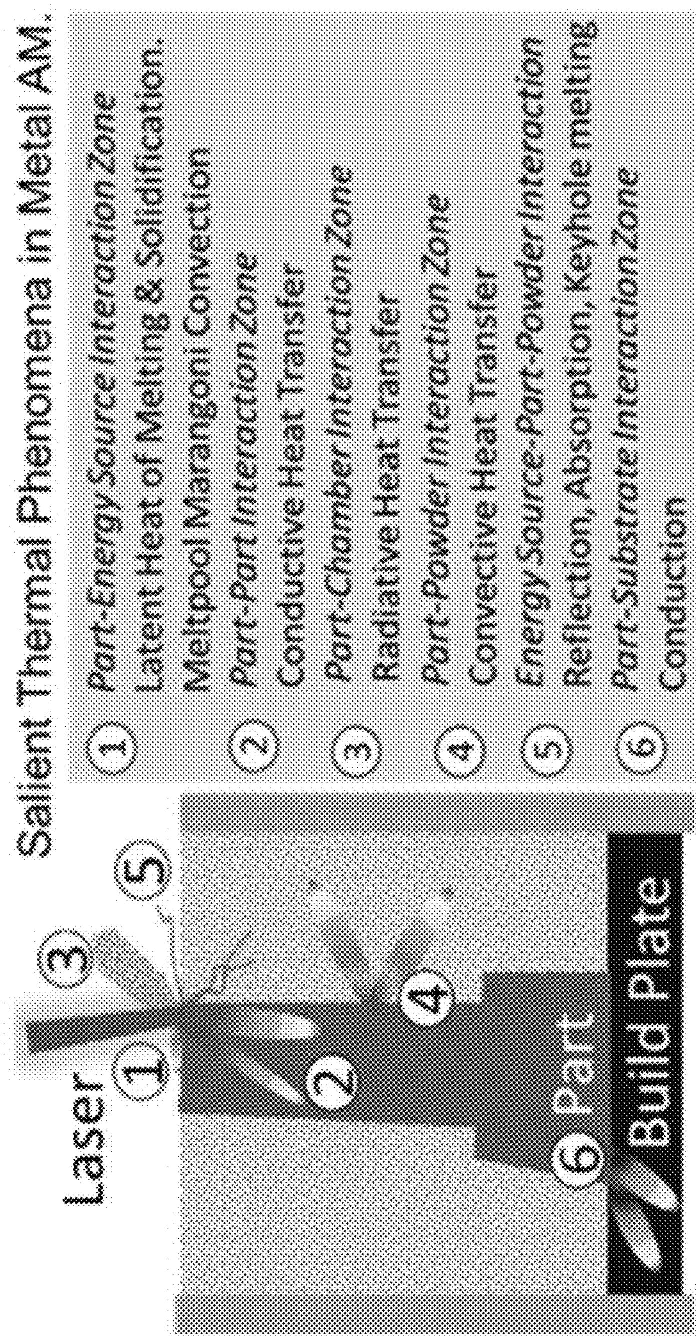
FIG. 3 depicts thermal phenomena in LPBF, which encompasses conductive, convective, and radiative heat transfer at multiple scales.

FIG. 3 depicts thermal phenomena in LPBF, which encompasses conductive, convective, and radiative heat transfer at multiple scales. The thermal phenomena in LPBF encompass conductive, convective and radiative heat transfer, across three scales, namely, meltpool (~100 μm), powder bed (<1 mm), and part-level (>1 mm). The disclosed techniques described herein relate to the part-level thermal aspects, which in turn can be influenced by the material properties, part design, build plan, and processing parameters, such as laser power and velocity settings.

Thermal modeling can be the first in a chain of requirements in the metal additive manufacturing industry. A key need in the industry is to extend thermal modeling for predicting microstructure, residual stresses (deformation), and mechanical properties of LPBF parts. This can be challenging as the length-scale for the causal thermal phenomena range from sub-micrometer (microstructure-level) to tens of millimeters (part-level). Hence inaccuracies in prediction of the temperature distribution can be magnified when used in other models.

Apart from accuracy, to be practically useful, thermal models must be computationally efficient when scaled to practical-scale parts with complex geometry. An important measure of computational efficiency is simulation time, which should be less than the time required to print the part. In this context, a majority of thermal modeling efforts focus on prismatic geometries at the part-level with typical build height of 25 mm, and single-track and one-layer test coupons at the microstructure and powder bed-levels, respectively.

Existing commercial thermal simulation packages in AM may use the FE method. A main challenge in FE-based modeling of the LPBF process is that the shape of the part continually changes as material is deposited, and therefore the part has to be repeatedly re-meshed. In other words, the meshing of the part can be the most time-consuming aspect of thermal modeling in AM. Moreover, the computation time for meshing can scale exponentially with volume of the part.

Besides proprietary meshing algorithms and opaque physical approximations, commercial packages may not allow the export of node-level temperature data needed for independent validation of the thermal distribution. Furthermore, because in adaptive meshing the node size is not constant but changes layer-to-layer, there may likely be an uncertainty in the temperature distribution predicted by commercial software for a given region. This uncertainty in temperature prediction can be liable to cascade into other aspects, such as predicting the thermal-induced deformation of LPBF parts. Lastly, commercial software packages may not provide for rigorous quantification of the uncertainty in thermal distribution and residual stress predictions introduced by adaptive meshing and physical approximations implemented therein.

While non-proprietary FE models may be validated, the computation time can be excessive—it can take days, if not hours to simulate the temperature distribution for a few layers. As an illustrative example, using FE-based thermal model in commercial packages to simulate just 1 minute of LPBF processing for a dia. 2 mm×0.3 mm impeller can require 20 hours of desktop computing.

In the context of validation of thermal models in LPBF, existing efforts may focus on predicting the temperature distribution for few layers of simple prismatic and cylindrical shapes using contact-based thermocouples. The temperature distribution can be subsequently correlated with microstructure evolved and distortion due to residual stress.

Temperature measurements in existing efforts were made using contact thermocouples embedded in the build plate or touching the bottom of the part. A drawback of such an approach can be that thermocouples embedded in the build plate or brazed to the bottom of the part may only track the temperature for that specific point, and not the entire surface. Further, a thermocouple embedded within the bottom of the part or the build plate may not sufficiently capture the temperature distribution on the top surface as the layers are progressively deposited and the part grows in size. While it may be conceivable to embed thermocouples within the part after stopping the process, this approach can be time-consuming, and can inherently alter the build conditions.

An alternative approach to using thermocouples, can be to measure the surface temperature of the part using an infrared thermal camera. A concern with use of thermal imaging may be that the surface temperature recorded by the thermal camera is not the absolute temperature but a relative trend. This is because the temperature measured by the thermal camera can depend on the moment-by-moment emissivity of the surface observed. The emissivity may not be constant but rather can be a function of the temperature of the measured surface, its roughness, and inclination of the thermal camera to the surface. In other words, the thermal camera would have to be calibrated to account for the emissivity of the part surface. Hyperspectral thermal imaging and two-wavelength pyrometry can be alternative approaches to obtaining the temperature distribution without adjusting for emissivity.

Figure 4A:
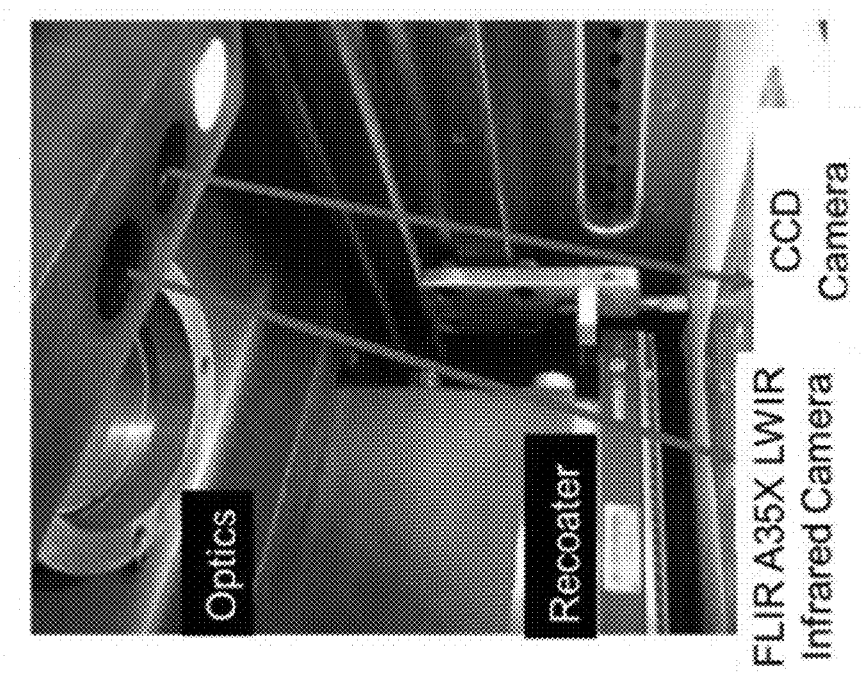
FIG. 4A illustrates an experimental setup used in the LPBF process described herein.
Figure 4B:
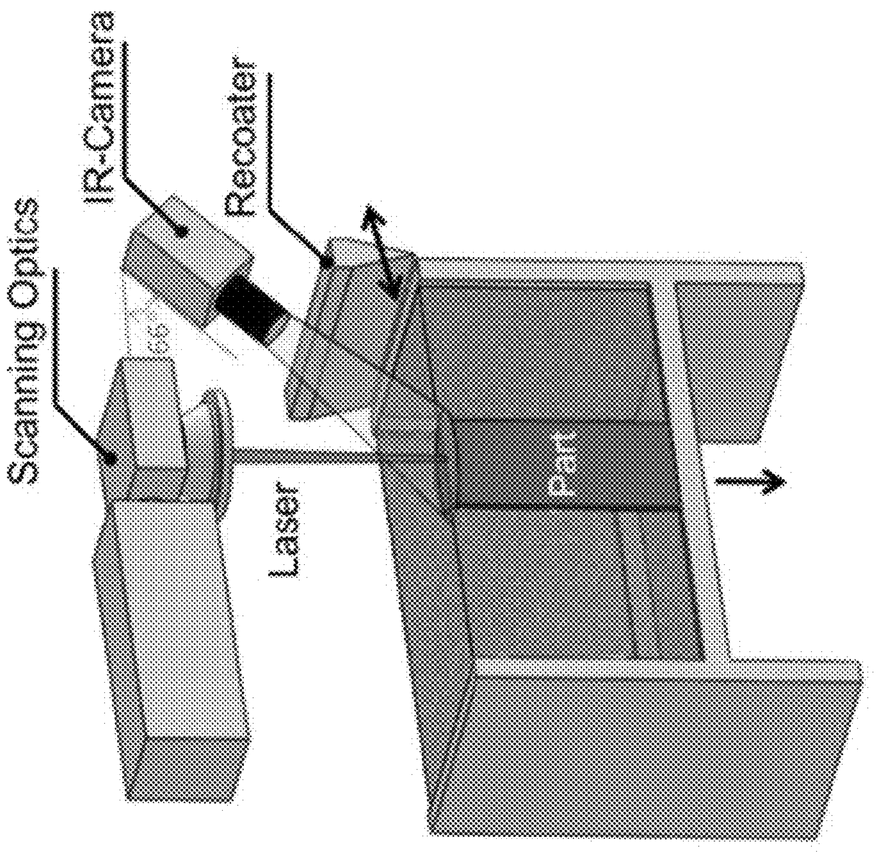
FIG. 4B illustrates a schematic diagram of the experimental setup used in the LPBF process described herein.

FIG. 4A illustrates an experimental setup used in the LPBF process described herein. FIG. 4B illustrates a schematic diagram of the experimental setup used in the LPBF process described herein. Referring to both FIGS. 4A-B, the stainless steel (SAE 316L) impeller depicted and described in reference to FIG. 2 was processed on a Renishaw AM 250 LPBF system with the build plate pre-heated to about 450 K (180° C.). The build parameters are displayed in Table 1.

TABLE 1

Summary of the material and processing parameters used for building the impeller.

| Process Parameter | Values [units] |
|---|---|
| Laser type and wavelength. | 200 W fiber laser, wavelength 1070 nm |
| Laser power, point distance, exposure time | 200 W, 60 um, 80 us |
| Inner border parameters - power, point distance, exposure time for the test part (center cylinder) | 200 W, 40 um, 90 us |
| Outer border parameters - power, point distance, exposure time (center cylinder) | 110 W, 20 um, 100 us |
| Hatch spacing | 110 um |
| Layer thickness | 50 um |
| Spot diameter of the laser | 65 um |
| Scanning strategy for the bulk section of the part | Meander-type scanning strategy with 45° rotation of scan path between layers. |
| Build atmosphere | Argon |
| Build plate preheat temperature | 180° C. (~450 K) |
| Material type | SAE 316L stainless steel |
| Powder size distribution | 10-45 um |

The experimental setup, as shown in FIGS. 4A-B, includes an infrared thermal camera (FLIR A35X) with wavelength in the 7 μm to 13 μm range (e.g., the longwave infrared spectrum). The thermal camera can be inclined at an angle of 66° to the horizontal and sealed inside a vacuum-tight box with a germanium window. Surface temperature data can be acquired at the sampling rate of 60 Hz. The response time is approximately 12 milliseconds. Thermal images can be captured at 320×256 pixels with a resolution of approximately 1 mm2 per pixel.

To calibrate the thermal camera readings, a thermocouple can be inserted in a deep cavity of a LPBF-processed test artifact. The test artifact can be subsequently heated in a controlled manner. The thermocouple in the cavity of the test artifact can record an absolute temperature (of the test artifact), and its surface temperature can be acquired with the thermal camera. Subsequently, the surface temperature trends can be measured by the thermal camera and mapped to the absolute temperature recorded by the thermocouple on fitting a calibration function.

The calibration process can be repeated with powder spread over the test artifact, and a separate calibration function can be developed. Calibration of the thermal camera with and without powder can ensure that the temperature readings account for the change in material emissivity in LPBF after a layer of fresh powder is raked on top of a just-fused layer. To ascertain the measurement uncertainty in the thermal camera readings the calibration procedure can be repeated a certain number of times, such as ten times. A 95% confidence interval in temperature readings in the 300 K to 800 K interval can be in the range of 0.1% to 1% of the mean temperature reading.

Figure 5:
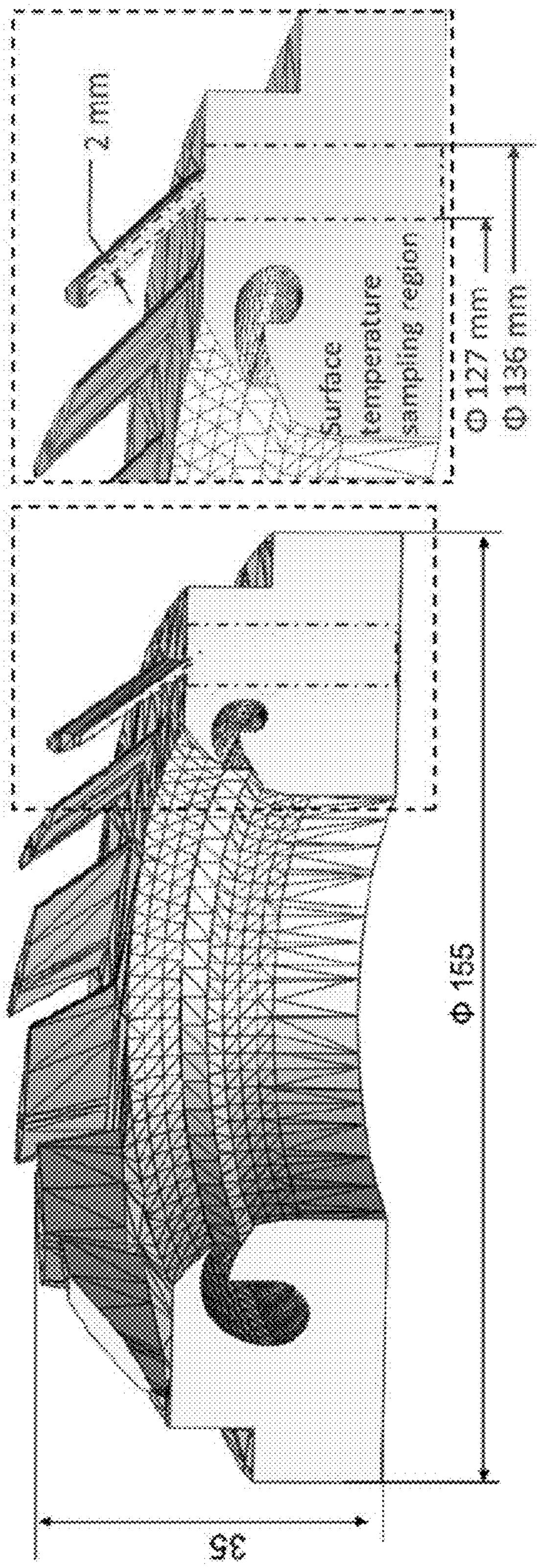
FIG. 5 illustrates a schematic diagram of a region where surface temperature data is extracted for the impeller using the disclosed techniques.

FIG. 5 illustrates a schematic diagram of a region where surface temperature data is extracted for the impeller using the disclosed techniques. This region can be selected since it is the most contiguous solid volume cross-section within the part boundary in the vertical direction. Sampling near the boundary of the part can be avoided owing to a limited spatial resolution of the thermal camera described herein. A 9-pixel×9-pixel sample (9 mm×9 mm area) in the main body of the part and a 2-pixel×2-pixel sample (2 mm×2 mm area) on the fin section can be chosen for monitoring the surface temperature. The thing cross-section of the fin can prevent sampling of a larger area.

Figure 6:
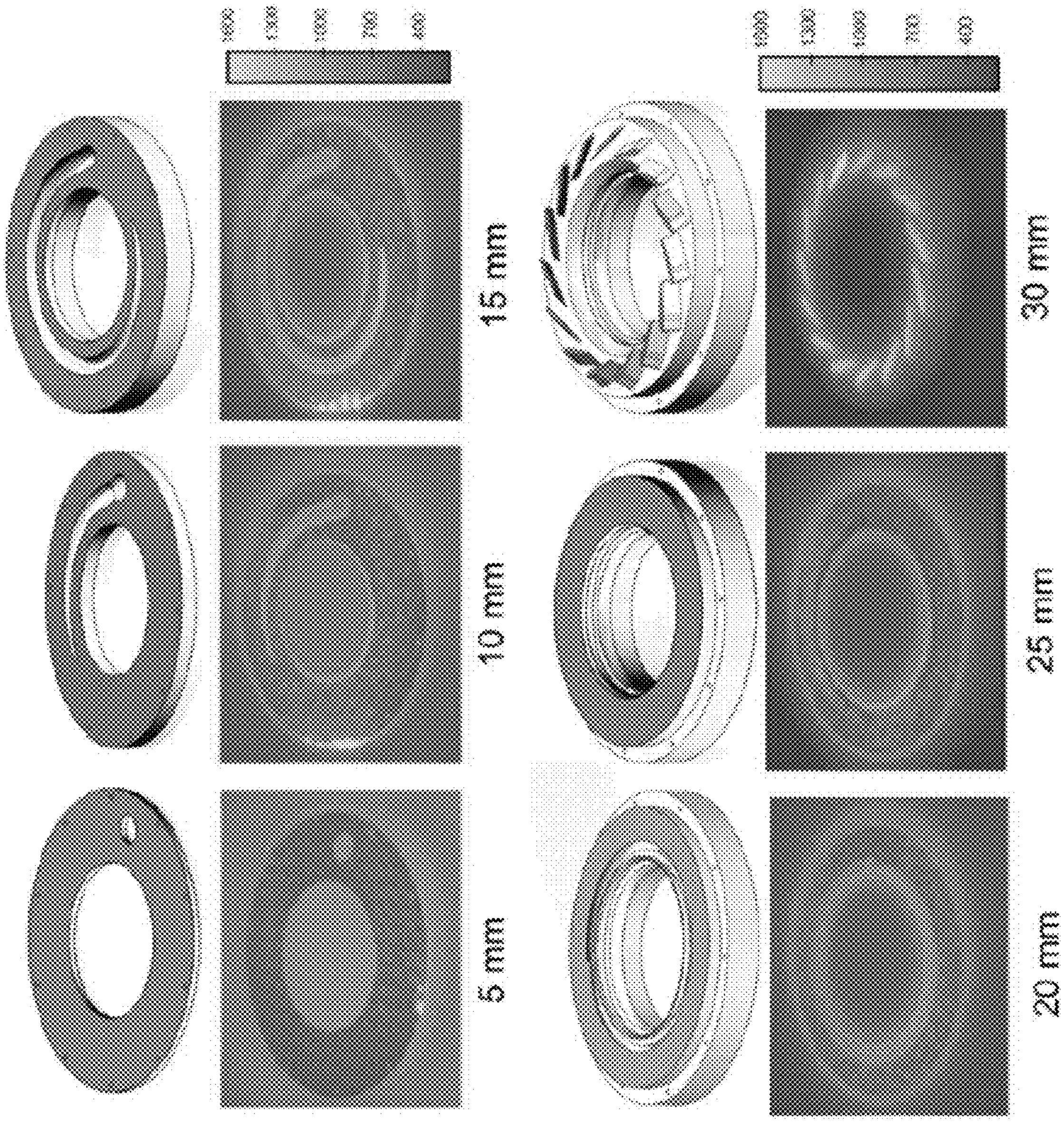
FIG. 6 illustrates a CAD model and corresponding infrared thermal images of the impeller at different build heights after a laser has finished melting a layer of the impeller.

FIG. 6 illustrates a CAD model and corresponding infrared thermal images of the impeller at different build heights after a laser has finished melting a layer of the impeller. Thus, FIG. 6 depicts the top-view cross sections of the part described in reference to FIG. 5 for select layers and their corresponding infrared thermal images after scanning the layers. The scale bar depicted in FIG. 6 can be in Kelvin. The melting point of the material (SAE 316L) can be 1600 K.

FIG. 7A is a graphical depiction of raw surface temperature for the region sampled in FIG. 5. These average raw surface temperatures can be tracked as function of the layer (e.g. build height). FIG. 7B is a graphical depiction of the zoomed in region from FIG. 7A showing a measurement of steady state surface temperature just before a laser fuses a new layer. The graph of FIG. 7B depicts presence of three large spikes. FIG. 7C illustrates a rationale for various signatures observed in the raw temperature signature of FIG. 7B. First, a large upward peak can correspond to a time when the laser actively scans the area demarcated in FIG. 5. The time elapsed between two upward spikes can denote a time between melting of successive layers. This can be termed an interlayer cooling time (ILCT). Second, after end of melting of a layer, a recoater can be returned to fetch fresh powder, and momentarily block the IR camera field-of-view. This can result in a large downward spike. Third, as the recoater deposits a fresh layer of powder, it can again momentarily block the field-of-view of the IR camera. This can cause a second downward spike in the temperature signal. Fourth, and as shown in FIG. 7B, the steady state surface temperature for each layer can be identified before the laser starts scanning the next layer.

Figure 8A:
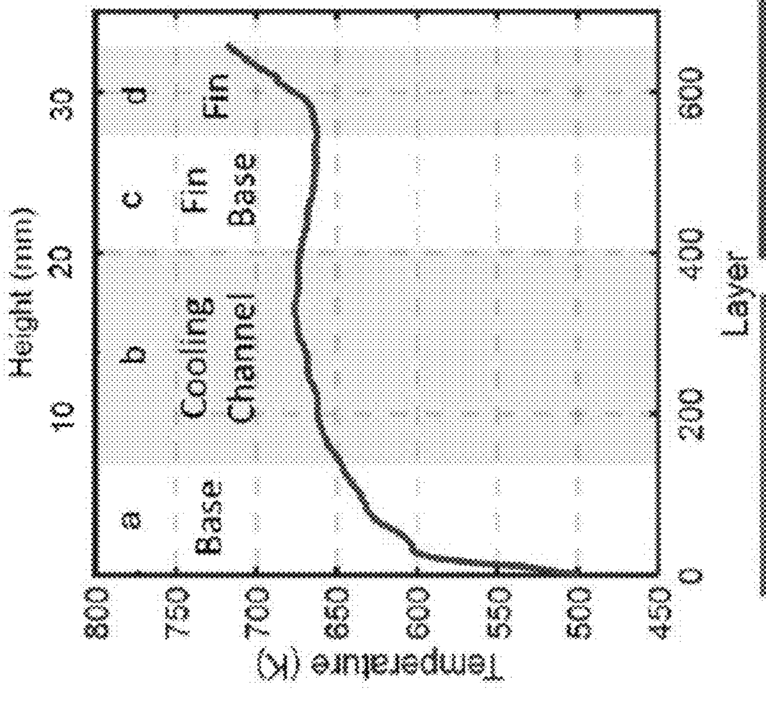
FIG. 8A is a graphical depiction of a steady state temperature of a top surface at each layer for the region sampled in FIG. 5.

FIG. 8A is a graphical depiction of a steady state temperature of a top surface at each layer for the region sampled in FIG. 5. The steady state temperature can be tracked as a function of the build height for the entire part. As shown, the temperature in the base region can be initially low, as the heat can be conducted away to the build plate and into the substrate owing to the large surface area of the base and relatively longer ILCT. The temperature can increase as more layers are deposited because the surrounding powder can act as an insulating medium. The internal cooling channel can tend to accumulate heat as the roof of the channel is unsupported (overhang), and there is unmelted powder trapped inside the cavity of the channel. The temperature increase can be rapid in the fin region due to its small cross section, shorter ILCT, and overhanging geometry.

Figure 8B:
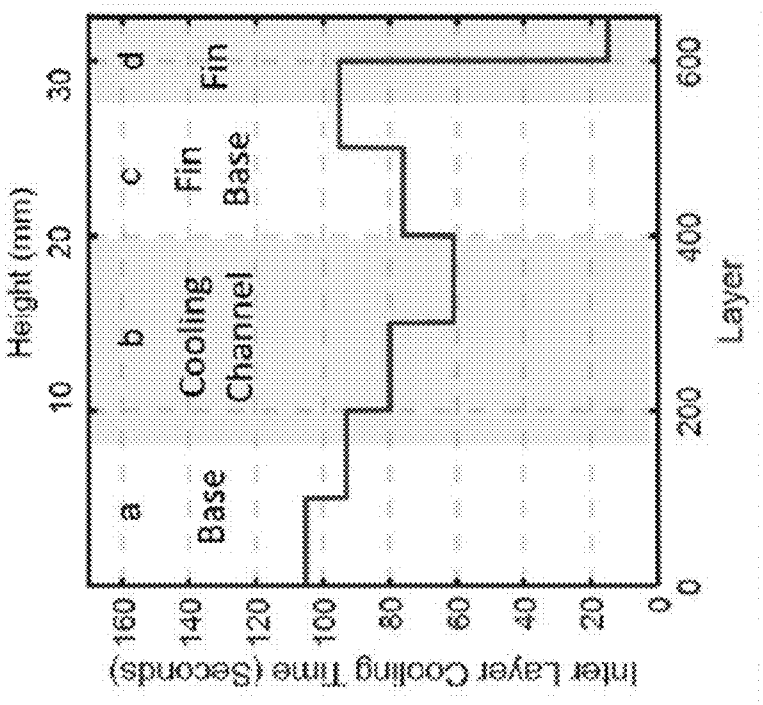
FIG. 8B is a graphical depiction of interlayer cooling time (ILCT) as a function of layer height.
Figure 8B:
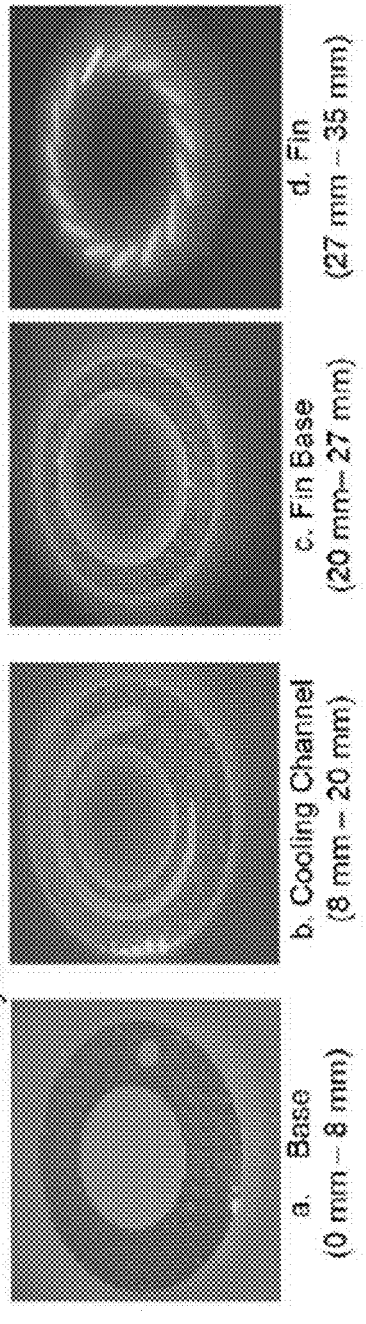

FIG. 8B is a graphical depiction of interlayer cooling time (ILCT) as a function of layer height. As shown, the ILCT can be plotted as a function of the build height. Since the area to be scanned can vary as a function of the build height, the ILCT can change continually throughout the build. For example, the annular base can have a larger area, and hence it can take longer to scan compared to the fin-shaped features near the top. As an example, the ILCT for the base can be close to 105 seconds compared to 15 seconds for the fin. The smaller scan area and shorter ILCT of the fin-shaped features can lead to accumulation heat, which in turn can influence the microstructure evolved.

Figure 9:
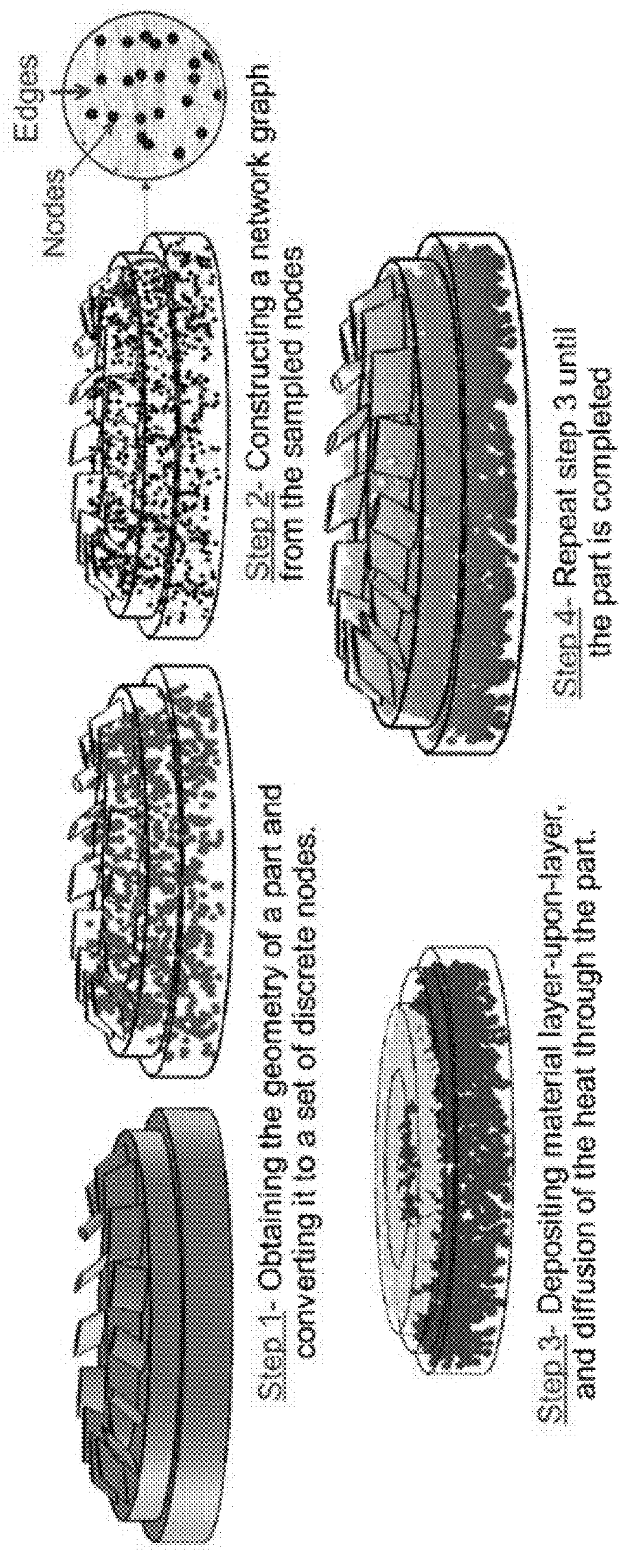
FIG. 9 illustrates a first strategy (Strategy 1) of graph theory thermal modeling for representing the entire part geometry as a network graph.

FIG. 9 illustrates a first strategy of graph theory thermal modeling for representing the entire part geometry as a network graph. To predict temperature distribution in a LPBF part, a continuum heat diffusion equation can be solved, Eqn. (1). FE analysis can be chiefly used to solve the heat diffusion equation and obtain the thermal history of a part.

$$\underbrace{\rho c_p}_{\text{Material Properties}} \frac{\partial T(x, y, z, t)}{\partial T} - k\overbrace{\left(\frac{\partial^2}{\partial x^2} + \frac{\partial^2}{\partial y^2} + \frac{\partial^2}{\partial z^2}\right)}^{\text{Laplacian}} T(x, y, z, t) = \overbrace{\frac{P}{l \times h \times t}}^{\text{Processing Parameters}} = E_v \quad (1)$$

Solving the heat diffusion equation can result in the temperature T(x, y, z, t) for a location (x, y, z) inside a part at a time instant t. The term Ev on the right-hand side of the equation can be called the energy density [$W \cdot m^{-3}$], and represents the rate of energy supplied by the laser or other energy source (e.g., electric arc, electron beam, etc.) to melt a unit volume of material. The energy density Ev is a function of laser power (P [W]), distance between adjacent passes of the laser (h [m]), length melted per unit time (l [m]), and the layer thickness (t [m]); these are the controllable parameters of the additive manufacturing process (e.g., LPBF process or directed energy deposition process).

The material properties are density ρ [kg·m−3], specific heat $c_p$ [J·kg−1·K−1)], and thermal conductivity k [W·m−1·K−1]. The effect of part shape is represented in the second derivative term on the left hand side of Eqn. (1). The second derivative can be called the continuous Laplacian. The graph theory approach can solve a discrete form of the heat diffusion equation for the temperature. Then the temperature can be adjusted to account for convective and radiative heat transfer phenomena.

As in existing FE approaches, the energy density Ev in Eqn. (1) can be replaced by an initial temperature T(x, y, z, t=0)=$T_o$; where $T_o$ is the melting point of the material.

$$\frac{\partial T(x, y, z, t)}{\partial T} - \alpha\left(\frac{\partial^2}{\partial x^2} + \frac{\partial^2}{\partial y^2} + \frac{\partial^2}{\partial z^2}\right)T(x, y, z, t) = 0; \quad (2)$$

$$\alpha = \frac{k}{\rho c_p}$$

Next, the heat diffusion equation can be discretized over M nodes by substituting the second order derivative (continuous Laplacian) with the discrete Laplacian Matrix (L), $$\frac{\partial T(x, y, z, t)}{\partial T} + \alpha(L)T(x, y, z, t) = 0; \tag{3}$$

The eigenvectors (ϕ) and eigenvalues (Λ) of the Laplacian matrix (L) can be found by solving the eigenvalue equation $L\phi=\phi\Lambda$. If the Laplacian matrix can be constructed in a manner such that it can be diagonally dominant and symmetric, the eigenvalues (Λ) can be non-negative, and the eigenvectors (ϕ) can form an orthogonal bases.

Because the transpose of an orthogonal matrix is the same as its inverse, hence, $\phi^{-1}=\phi'$ and $\phi\phi'=1$, the eigenvalue equation $L\phi=\phi\Lambda$ may be post-multiplied by ϕ' to obtain $L=\phi\Lambda\phi'$.

Using this relationship in Eqn. (3), $$\frac{\partial T(x, y, z, t)}{\partial T} + \alpha(\phi\Lambda\phi')T(x, y, z, t) = 0; \tag{4}$$

Eqn. (4) can be a first order, ordinary linear differential equation, which can be solved as, $$T(x,y,z,t)=e^{-\alpha(\phi\Lambda\phi')t}T_0 \tag{5}$$

The term $e^{-\alpha(\phi\Lambda\phi')}$ can be simplified via a Taylor series expansion, $$e^{-\alpha(\phi\Lambda\phi')t} = 1 - \frac{\phi\Lambda\alpha t\phi'}{1!} + \frac{(\phi\Lambda\alpha t\phi')^2}{2!} - \frac{(\phi\Lambda\alpha t\phi')^3}{3!} + \ldots = \tag{6}$$

$$1 - \frac{\phi\Lambda\alpha t\phi'}{1!} + \frac{(\phi\Lambda\alpha t\phi')(\phi\Lambda\alpha t\phi')}{2!} - \frac{(\phi\Lambda\alpha t\phi')(\phi\Lambda\alpha t\phi')(\phi\Lambda\alpha t\phi')}{3!} + \ldots$$

$$\text{substituting } \phi\phi' = 1,$$

$$e^{-\alpha(\phi\Lambda\phi')t} = \phi\phi' - \frac{\phi\Lambda\alpha t\phi'}{1!} + \frac{\phi(\Lambda\alpha t)^2\phi'}{2!} - \frac{\phi(\Lambda\alpha t)^3\phi'}{3!} + \ldots \phi e^{-\alpha\Lambda t}\phi'$$

Substituting, $e^{-\alpha(\phi\Lambda\phi')t}=\phi e^{-\alpha\Lambda t}\phi'$ into equation (5) can provide, $$T(x,y,z,t)=\phi e^{-\alpha\Lambda gt}\phi' T_0 \tag{7}$$

Eqn. (7) can entail that the heat diffusion equation can be solved as a function of the eigenvalues (Λ) and eigenvectors (ϕ) of the Laplacian Matrix (L), constructed on a discrete set of nodes. In Eqn. (7) an adjustable coefficient g [$m^{-2}$] can be called the gain factor to calibrate the solution and adjust the units. The gain factor can be calibrated once for a particular material, and would thereafter remain constant.

Thus, per Eqn. (7), the temperature of the nodes can be estimated considering conductive heat transfer only. Next, heat loss due to radiation and convection at the top boundary of the part can be included. For this purpose, the nodes at the top boundary can be demarcated, and the temperature of the boundary nodes ($T_b$) can be adjusted using lumped capacitive theory:

$$T_b=e^{-\bar{h}(\Delta t)}(T_{bi}-T_\infty)+T_\infty \tag{8}$$

Where, $T_\infty$ (=300 K) can be the temperature of the surroundings, $T_{bi}$ can be the initial temperature of the boundary nodes, $T_b$ can be the temperature of the boundary nodes after heat loss occurs, Δt can be the dimensionless time between laser scans, and $\bar{h}$ can be the normalized combined coefficient of radiation (via Stefan-Boltzmann law) and convection (via Newton's law of cooling) from boundary to the surroundings.

The graph theory approach can provide one or more advantages over FE analysis. For example, the graph theory approach can eliminate mesh-based analysis. Graph theory approach can represent the part as describe nodes, which can eliminate tedious meshing steps inherent in FE analysis. As another example, the graph theory approach can eliminate matrix inversion steps. While FR analysis can rest on matrix inversion at each timestep for solving the heat diffusion equation, the graph theory approach can be based on matrix multiplication operations, T(x, y, z, t)=$\phi e^{-\alpha\Lambda t}\phi'$, which can greatly reduce computational burdens. As yet another example, the graph theory approach can provide for simplifying time stepping. The time t for which the heat is diffused in the part in Eqn. (7) can be set to one large time step without computing the temperature at intermediate discrete steps as in FE analysis.

To facilitate computation, the graph theory approach can make one or more assumptions. The first is heat transfer-related assumptions. Material properties, such as the specific heat can be considered constant, and may not change with temperature. Moreover, effect of the latent heat aspects may not be considered. In other words, the effect change of state of material from solid to a liquid, and then back to a solid may not be accounted in the graph theory approach. The second is energy source-related assumptions. The laser can be considered a point heat source, e.g., the shape of the meltpool may not be considered in the graph theory approach.

Furthermore, it can be assumed that the topmost layer of the powder can completely absorb the incident laser beam. Hence, the graph theory approach can ignore the effect of reflectivity and powder packing density.

Part of the graph requires constructing the network graph, and obtaining the eigenvalues (Λ) and eigenvectors (ϕ) in Eqn. (7). As described herein, three strategies can be used to represent the part geometry in the form of a discrete nodes, and subsequently, compute the eigenvectors (ϕ) and eigenvalues (Λ) of the Laplacian Matrix (L). Of these three strategies, the first strategy depicted and described in reference to FIG. 9 involves populating the entire part with nodes. Strategy 2 depicted and described in reference to FIG. 11 takes advantage of radial symmetry of the impeller to simulate a representative section of the geometry. Strategy 3 depicted and described in reference to FIG. 12 simulates large horizontal sub-sections of the part, one at a time, instead of the entire part, as in Strategy 1 depicted and described in reference to FIG. 9.

Referring to FIG. 9, the first strategy can include representing the entire part geometry as a network graph. The first strategy provides for solving the heat diffusion equation over the network graph constructed over a set of randomly sampled discrete nodes in the part. The first strategy includes four steps, as described herein.

Step 1 of the first strategy can include converting the entire part into a set of discrete number of nodes (n) that are randomly allocated through the part.

The part geometry can be represented in the form of STL file in terms of vertices and edges. A number of n vertices can be randomly sampled in each layer. These randomly sampled vertices can be nodes. The spatial position of these nodes can be recorded in terms of their Cartesian coordinates (x, y, z). In the ensuing steps, the temperature at each time step can be stored at these nodes. The random sampling of the nodes can bypass the expensive meshing of FE analysis and can be one of the reasons for the reduced computational burden of the graph theory approach.

Step 2 can include constructing a network graph among randomly sampled nodes. Consider, for example, two nodes, $\pi_i$ and $\pi_j$ whose spatial Cartesian coordinates are $c_i \equiv (x_i, y_i, z_i)$ and $c_j \equiv (x_j, y_j, z_j)$. The Euclidean distance between $\pi_i$ and a node $\pi_j$ can be $\|c_i - c_j\| = \sqrt{(x_i-x_j)^2+(y_i-y_j)^2+(z_i-z_j)^2}$. The two nodes can be connected if they are within l mm of each other, called the characteristic length. The characteristic length can be based on the geometry of the part and can be set depending on the feature with the finest dimension of the part. After all, there should be no direct heat transfer between nodes that are physically far from each other. If two nodes $\pi_i$ and $\pi_j$ are within a radius of l, they can be connected by an edge whose weight $a_{ij}$ is given by, $$a_{i,j} = e^{-\frac{\|c_i - c_j\|^2}{\sigma^2}} \quad \forall\, i \neq j \text{ and } \|c_i - c_j\| \leq l$$
$$a_{i,j} = 0, \quad \text{otherwise} \tag{1}$$

Figure 9A:
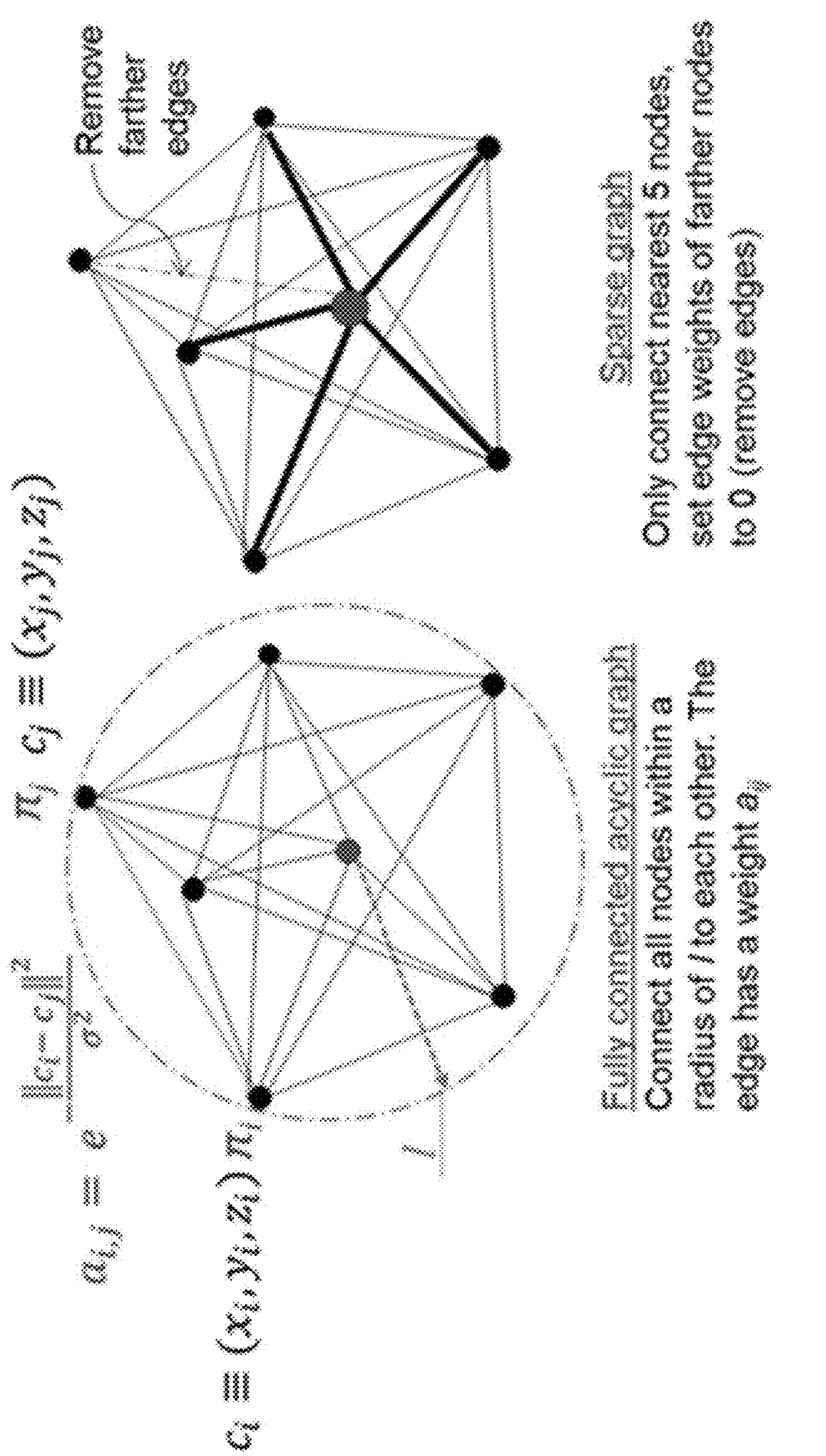
FIG. 9A depicts constructing the network graph of FIG. 9.

The edge weight, $a_{ij}$ can represent the normalized strength of the connection between the nodes $\pi_i$ and $\pi_j$ and can have a value between 0 and 1; σ2 can be the variation of the distance between all nodes that are connected to each other (e.g., within a radius of l). Therefore, each node can be connected to every node within a l neighborhood, but not to itself. In the illustrative example described herein, l was set to 3 mm corresponding to the finest feature of the impeller, viz., fin section. Next, the network graph can be made sparse by removing some edges; nodes may only be connected to a certain number of its nearest neighboring nodes (η=5 in this illustrative example). In other words, for a particular node, edges farther (in terms of Euclidean distance) than the nearest five can be removed by setting their edge weight to zero. The sparsening of the network graph can be advantageous for computational aspects. Constructing the network graph as described herein is depicted in FIG. 9A. As mentioned, constructing the network graph involves connecting a node to all nodes within a radius l with an edge and then sparsening the graph by removing edges that are farther away than the nearest five nodes.

From a physical perspective, the edge weight $a_{ij}$ can embody the Gaussian law—called heat kernel—in the following manner. The closer a node $\pi_i$ is to another $\pi_j$, exponentially stronger is the connection ($a_{ij}$) and hence proportionally greater is the heat transfer between them.

The matrix, formed by placing $a_{ij}$ in a row i and column j, is called the adjacency matrix, $A=[a_{ij}]$.

$$A = \begin{bmatrix} 0 & a_{1,2} & a_{1,3} & \cdots & a_{1,N} \\ a_{2,1} & 0 & a_{2,3} & \cdots & a_{2,N} \\ a_{3,1} & a_{3,2} & 0 & \cdots & a_{3,N} \\ \vdots & \vdots & \vdots & \ddots & \vdots \\ a_{N,1} & a_{N,2} & a_{N,3} & \cdots & 0 \end{bmatrix} \tag{11}$$

The degree of node $\pi_i$ can be computed by summing the ith row (column) of the adjacency matrix A.

$$d_{i\cdot} = \sum_{\forall j} a_{i,j} \tag{2}$$

The diagonal degree matrix D can be formed from $D_i$'s as follows, where n is a number of nodes, $$D = \begin{bmatrix} d_{1\cdot} & \cdots & 0 \\ \vdots & \ddots & \vdots \\ 0 & \cdots & d_{n\cdot} \end{bmatrix}. \tag{3}$$

From the adjacency matrix (A) and degree matrix (D), the discrete graph Laplacian matrix L can be obtained using the following matrix operations. The discrete Laplacian L can be cast in matric form as, $$L \stackrel{def}{=} (D - A) \tag{4}$$

$$L = \begin{bmatrix} +d_{1\cdot} & -a_{1,2} & -a_{1,3} & \cdots & -a_{1,N} \\ -a_{2,1} & +d_{2\cdot} & -a_{2,3} & \cdots & -a_{2,N} \\ -a_{3,1} & -a_{3,2} & +d_{3\cdot} & \cdots & -a_{3,N} \\ \vdots & \vdots & \vdots & \ddots & \vdots \\ -a_{N,1} & -a_{N,2} & -a_{N,3} & \cdots & +d_{N\cdot} \end{bmatrix}$$

Finally, the Eigen spectra of the Laplacian L, computed using standard methods can satisfy the following relationship:

$$L\phi = \phi\Lambda. \tag{5}$$

Since the matrix L can be diagonally dominant with non-zero principal diagonal elements and negative off-diagonal elements, it falls under a class of matrices called Stieltjes matrix. For such matrices the eigenvalues of L can be non-negative (Λ≥0) and eigenvectors can be orthogonal to each other ($\phi\phi^T=1$). Thus, constructing the graph in the manner described in Eqn. (9)-Eqn. (14) can allow for the heat diffusion equation to be solved as a superposition of the eigenvalues and eigenvectors of L as explained in the context of Eqn. (7).

Step 3 can include simulating deposition of the entire layer and diffusing the heat throughout the network. To aid computation, the simulation can proceed in the form of a superlayer (metalayer). As an illustrative example, 10 actual layers can be used, each of height 50 μm for one superlayer; the thickness of each superlayer being 0.5 mm. An entire superlayer can be assumed to be deposited at the melting point of the material $T_0$ (=1600 K for SAE 316L). By assuming that an entire layer can be deposited at the melting point of the material, the graph theory approach can ignore transient meltpool phenomena. To explain further, the meltpool temperature can be considerably above the melting point of the material, and the transient meltpool aspects, such its instantaneous temperature and size may be determinants of the microstructure evolution. The graph theory approach therefore can be used to capture the effects of part-level thermal history, such as distortion, cracking, delamination and failure of supports, and not the transient meltpool-related aspects, e.g., microstructure heterogeneity and granular-level solidification cracking.

The heat can diffuse to the rest of the part below the current layer through the connections between the nodes. If the temperature at each node is arranged in matrix form, the steady state temperature T after time t (where t=interlayer cooling time) can be obtained as a function of the eigenvectors ($\phi$) and eigenvalues ($\Lambda$) of the Laplacian matrix (L) of the network graph, viz., Eqn. (7), repeated herewith: $T(x, y, z, t)=\phi e^{-\alpha g \Lambda t}\phi' T_0$.

After the temperature of each node is obtained, convective and radiative thermal losses can be included for the nodes on the top surface of each layer in Eqn. (8).

Finally, step 4 can be repeating step 3 until the part is built. A new layer(s) of powder can be deposited at the melting point $T_0$. The simulation of new powder layers can be achieved by adding more nodes on top of existing nodes, akin to the element birth-and-death approach used in FE-based modeling of AM processes.

Strategy 1 depicted and described in reference to FIG. 9 can be used for relatively small volumes and simple geometries such as cylinders and cones. In Strategy 1 a fixed number of nodes can be distributed in the part and can be allocated randomly with uniform density. Consequently, certain features that have a thin cross section tend to have fewer nodes. For instance, the cross-sectional area of the fin-like features near the top of the part can be considerably smaller than the rest of the part. Due to fewer nodes in the finer feature compared to the rest of the part, temperature distribution estimated in a fine feature may not be as accurate. Strategy 1 can also cause sparse distribution of nodes in fine features, such as the overhang section of the cooling channel and fins. Since the number of nodes in fine features is low, and a fixed number of nodes ($\eta=5$) are connected to each other, the nodes in the fine feature regions can become connected to the nodes in the rest of the part across the boundary of the part and powder. In other words, the edge connecting nodes may cross the boundary of the part, an occurrence termed as short-circuiting.

Figure 10:
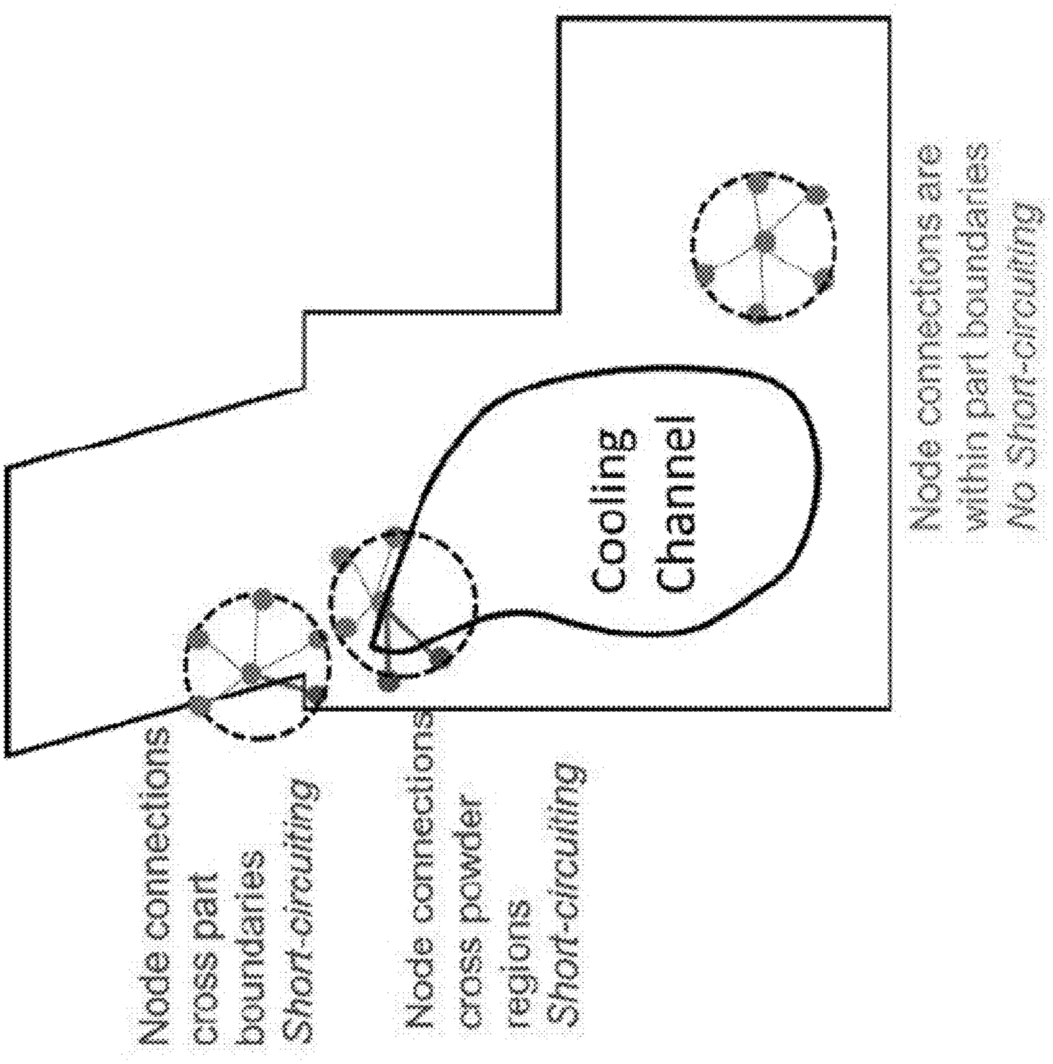
FIG. 10 depicts short-circuiting due to edges crossing part boundaries and reaching across powder, in reference to the first strategy of FIG. 9.

Examples of short-circuiting are shown in FIG. 10. FIG. 10 depicts short-circuiting due to edges crossing part boundaries and reaching across powder, in reference to the first strategy of FIG. 9. For instance, the edge connecting nodes should not cross the boundaries of the part or across the internal voids. An approach to avoid short-circuiting in Strategy 1 can be to increase the node density, which may increase the computation time.

Strategy 1 can also be computationally intensive. In Strategy 1, a large number of nodes for the entire part can be stored in RAM memory of a desktop computer. The Laplacian matrix (L) grows in size with the part. Consequently, the computation time can increase as layers are added.

Moreover, at every time step location and connectivity of every node over the entire part can be tracked, as well as the Laplacian matrix (L), both of which scale as O2(n) of the number of nodes (n). The number of eigenvalues ($\Lambda$) and eigenvectors ($\phi$) also can increase with the number of nodes. Consequently, the computation time for Strategy 1 can scale exponentially with the number of nodes. Therefore, strategies 2 and 3, depicted and described in reference to FIGS. 11 and 12 can be used.

Figure 11:
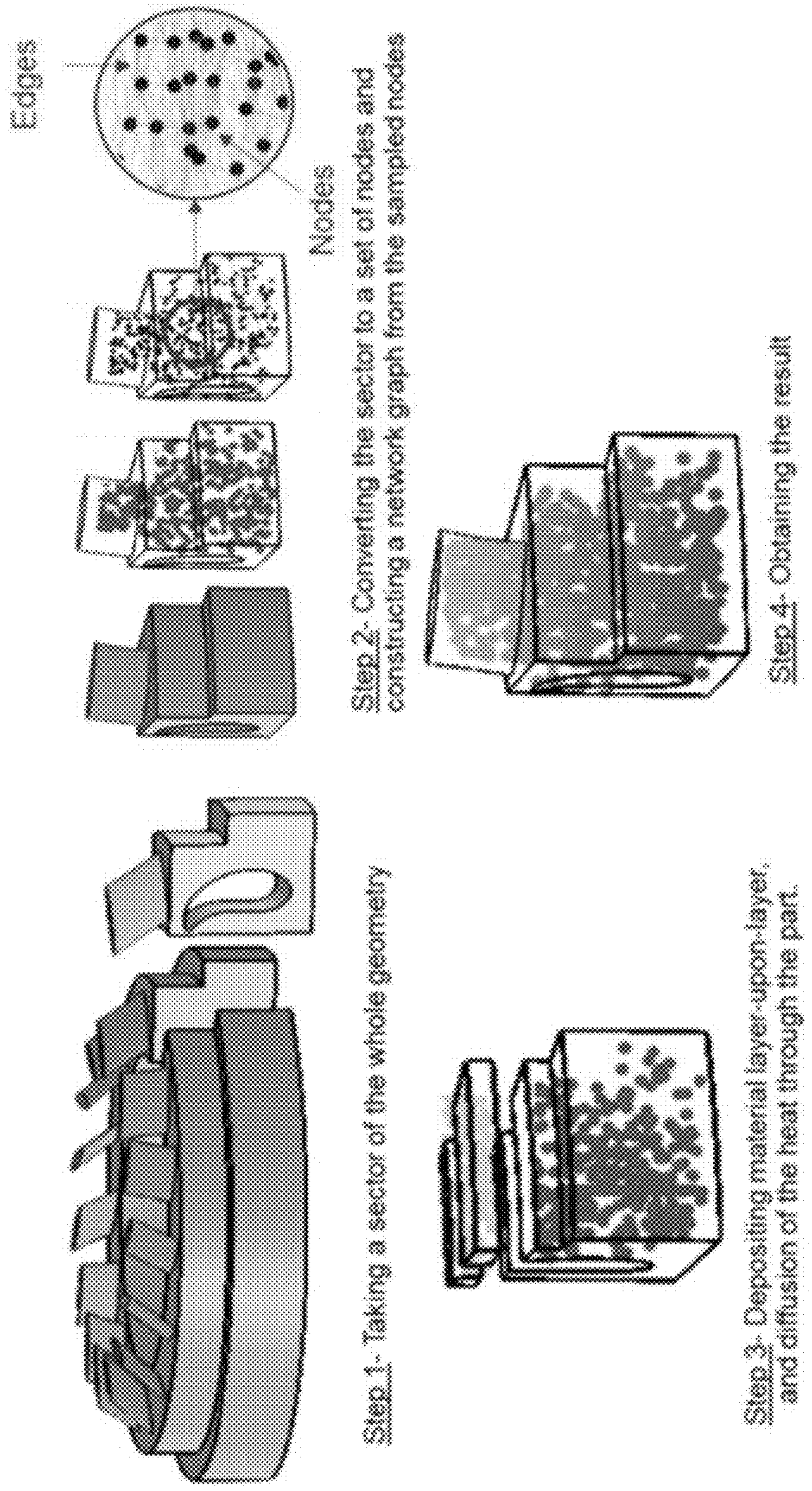
FIG. 11 illustrates a second strategy (Strategy 2) of graph theory thermal modeling for simulating a representative cross section of the part, or part scaling.

FIG. 11 illustrates a second strategy of graph theory thermal modeling for simulating a representative cross section of the part, or part scaling. In strategy 2, instead of simulating the entire part, a radial section, or a sector, of the part can be chosen for layer-by-layer analysis. The graph thermal modeling steps can be identical to the previous Strategy 1, described in reference to FIG. 9. As shown, a sector of the whole geometry can be taken in step 1. The sector can be converted to a set of nodes and a network graph can be constructed from the sampled nodes in step 2. Material layer-upon-layer can be deposited and heat can be diffused through the part in step 3. Results can be obtained in step 4. Strategy 2 can be best applied to symmetrical parts.

Figure 12:
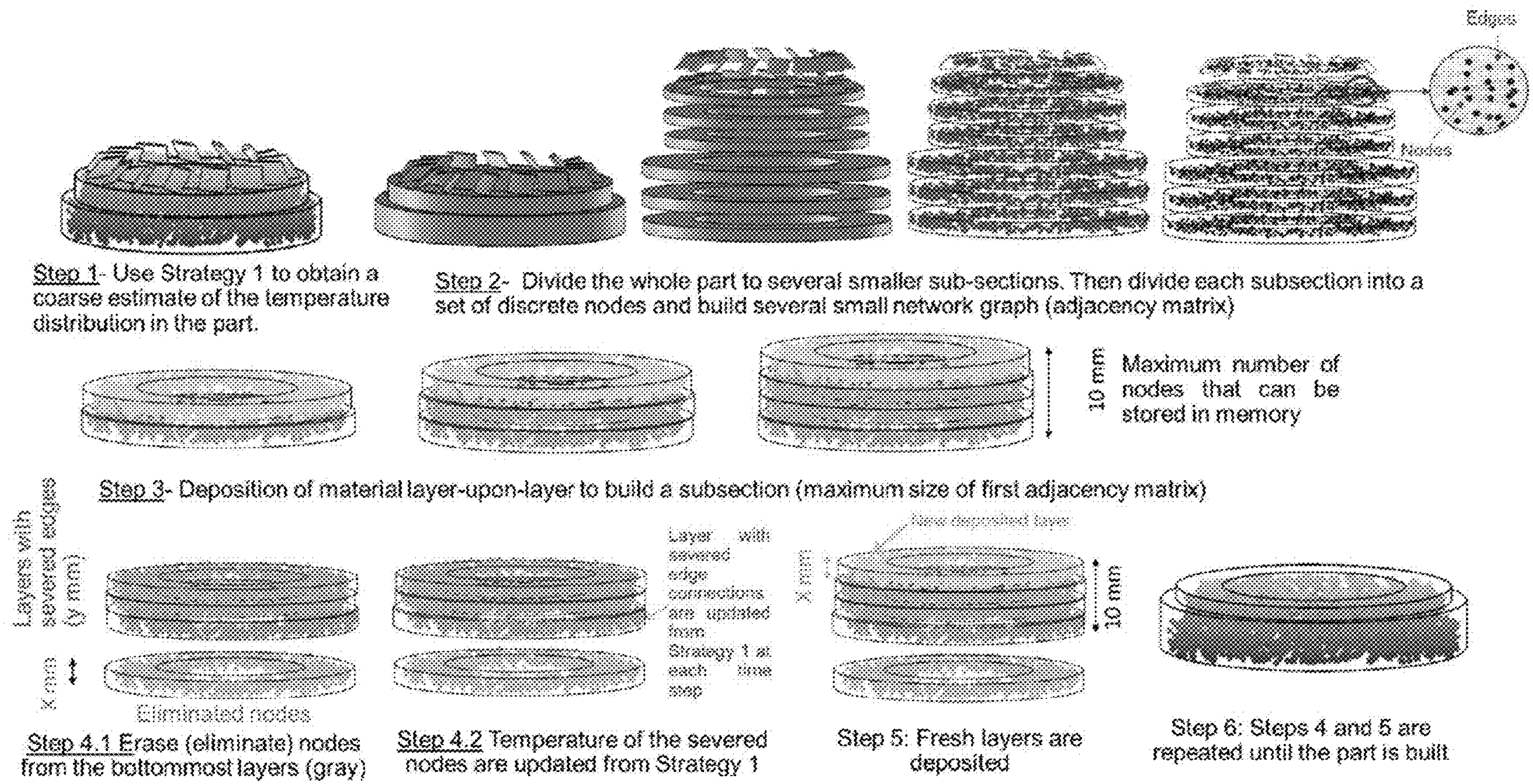
FIG. 12 illustrates a third strategy (Strategy 3) of graph theory thermal modeling for simulating the part in progressive horizontal subsections and eliminating nodes in preceding subsections.

FIG. 12 illustrates a third strategy of graph theory thermal modeling for simulating the part in progressive horizontal subsections and eliminating nodes in preceding subsections. Strategy 3 can be a generalized approach to simulate any geometry. It can overcome limitations of Strategy 1 by dividing the part into horizontal subsections and simulating each subsection in a progressive, piece-wise manner. In Strategy 3, nodes can be removed in previous layers that lie far below the current layer being processed (e.g., refer to FIGS. 19A-C).

The rationale for removing nodes in previous layers is that the temperature cycles can be substantially attenuated by the time they reach deeper into the prior layers. This removal of nodes from previous layers not only overcomes computational burdens, it also can reduce inaccuracy as each subsection can be populated with a large number of nodes.

In step 1, Strategy 3 can be used with sparse nodes to obtain a coarse estimate of the thermal history. A coarse estimate of the temperature trends for the whole part can be obtained using Strategy 1 with reduced node density. The purpose of this step is to provide a rough estimate of each layer's thermal history at each time step, which can be used at later Step 4.

Step 2 can include dividing the part into smaller horizontal subsections (layerwise partitioning). The part can be divided into horizontal subsections, and each subsection can be populated with discrete nodes. A network graph can be created over each subsection. Each subsection can have its own network graph. Hence, there may be no edges connecting the two adjacent subsections. The height of the subsection can be dictated by the maximum size of the Laplacian matrix that can be stored in the memory of the computer. In the illustrative example depicted and described herein, the maximum size of the Laplacian matrix that can be stored at any time in memory corresponded to a height of 10 mm of the part.

In step 3, deposition of material layer by layer can be simulated for the first subsection. The layers can be deposited to reach the maximum size of the Laplacian matrix (10 mm height).

In step 4, nodes in previous subsections can be removed. After the simulation of the first subsection is finished (10 mm), the computer memory can be cleared (nodes can be erased), and the temperature of nodes with severed connections can be estimated based on Step 1. This can be done in two sub-steps. In the first sub-step, nodes representing the first few layers of the previous subsection can be removed. The removal of nodes can reduce the size of the Laplacian matrix, and the number of nodes stored in memory. For example, the first 4 mm of the previous sub-section can be removed, and thus there can now be space in the computer memory to accommodate 4 mm of new layers to be deposited. The height of the erased nodes is termed as moving distance. The second sub-step can include removal of nodes, which causes edge connections to be severed, thereby changing topology of the network. One effect of removing nodes is that heat can accumulate in the nodes with edges connected to the erased nodes due to disconnection of the network graph. The available initial layers nodes with severed edges are termed interface nodes. The temperature of the interface nodes can be reinitiated at each time step based on the coarse estimates from Step 1. In the illustrative example described herein, the interface nodes can be 3 superlayer thickness (1.5 mm).

In step 5, the deposition of a new subsection can be simulated. Fresh layers in the next sub-section can be added until the maximum number of layers that can be stored in memory is reached. In this illustrative example, fresh layers corresponding to an added 4 mm in height (80 actual layers, 8 superlayers) can be deposited until an incremental height of 10 mm is reached (200 actual layers).

Finally, step 6 can include cycling through steps 4 and 5 until the part is fully built.

As described throughout, Strategy 3 depicted and described in reference to FIG. 12 is advantageous to reduce computation 1. Moreover, Strategy 3 can be generalized to any shape. In some implementations, temperature history of eliminated nodes may not be tracked for the entire process. Tradeoff can be mitigated by setting the moving distance to smaller values.

The graph theory approach can require tuning three parameters—namely, the number of nodes in the volume simulated (n), the number of nodes to which each node is connected (η), and the gain factor (g) in Eq. (7), which controls the rate of heat diffusion through the nodes. In this illustrative example, η=5 and g=1.5×10$^4$. The graph theory simulation parameters and material properties are described in Table 2. Also included in Table 2 is a term called characteristic length (l, mm).

TABLE 2

Summary of the simulation parameters used in this work.

| Simulation Parameters | Values |
|---|---|
| Heat loss coefficient from part to surroundings, $\hbar$[W · m$^{-2}$ · K] | 1 × 10$^{-5}$ |
| Heat loss coefficient from part to substrate (sink), $\hbar$[W · m$^{-2}$ · K] | 1 × 10$^{-2}$ |
| Thermal diffusivity (α), [m$^2$/s] | 3 × 10$^{-6}$ |
| Density, ρ [kg/m$^3$] | 8.440 |
| Melting Point ($T_0$) [K] | 1.600 |
| Ambient temperature, $T_\infty$ [K] | 300 |
| Characteristic length [mm] | 3 |
| Number of neighbors which is connected to each node (η) | 5 |
| Superlayer thickness [mm] | 0.5 (10 actual layers) |
| Gain factor (g) | 1.5 × 10$^4$ |
| Computational hardware | AMD Ryzen Threadripper 3970X, @3.7 GHz with 128 GB RAM. |
| Computation Software | MATLAB2020a |

The characteristic length (l) can be defined as the distance beyond which there should not be any physical connection between nodes to avoid short-circuiting. It can be estimated by measuring the minimum dimension of various features in the part. The thickness of the fin (~3 mm) can also be one of the smallest dimensions, albeit, certain sections of the cooling channels can be thinner. Hence, l=3 mm. The characteristic length (l) can also facilitate estimation of the minimum number of nodes (n), as a function of the number of neighbors (η=5) and volume (V) of the geometry simulated via the following relationship:

$$= \sqrt{\sum^{k} \frac{(T_i - \hat{T}_i)^2}{k}}$$

Two metrics can be used to assess the accuracy and precision of the graph theory approach, namely, the mean absolute percentage error (MAPE) and root mean square error (RMSE), shown in Eqns. (16)(a) and (b), respectively.

$$MAPE = \frac{100\%}{k} \times \sum_{i=1}^{k} \left| \frac{T_i - \hat{T}_i}{T_i} \right| \tag{16)(a}$$

$$RMSE = \sqrt{\sum_{i=1}^{k} \frac{(T_i - \hat{T}_i)^2}{k}} \tag{16)(b}$$

Where k is the number of instances in time that can be compared over the duration of the deposition, i can be the current instant of time, $T_i$ can be the measured temperature, and Ti can be the predicted temperature.

Figure 13:
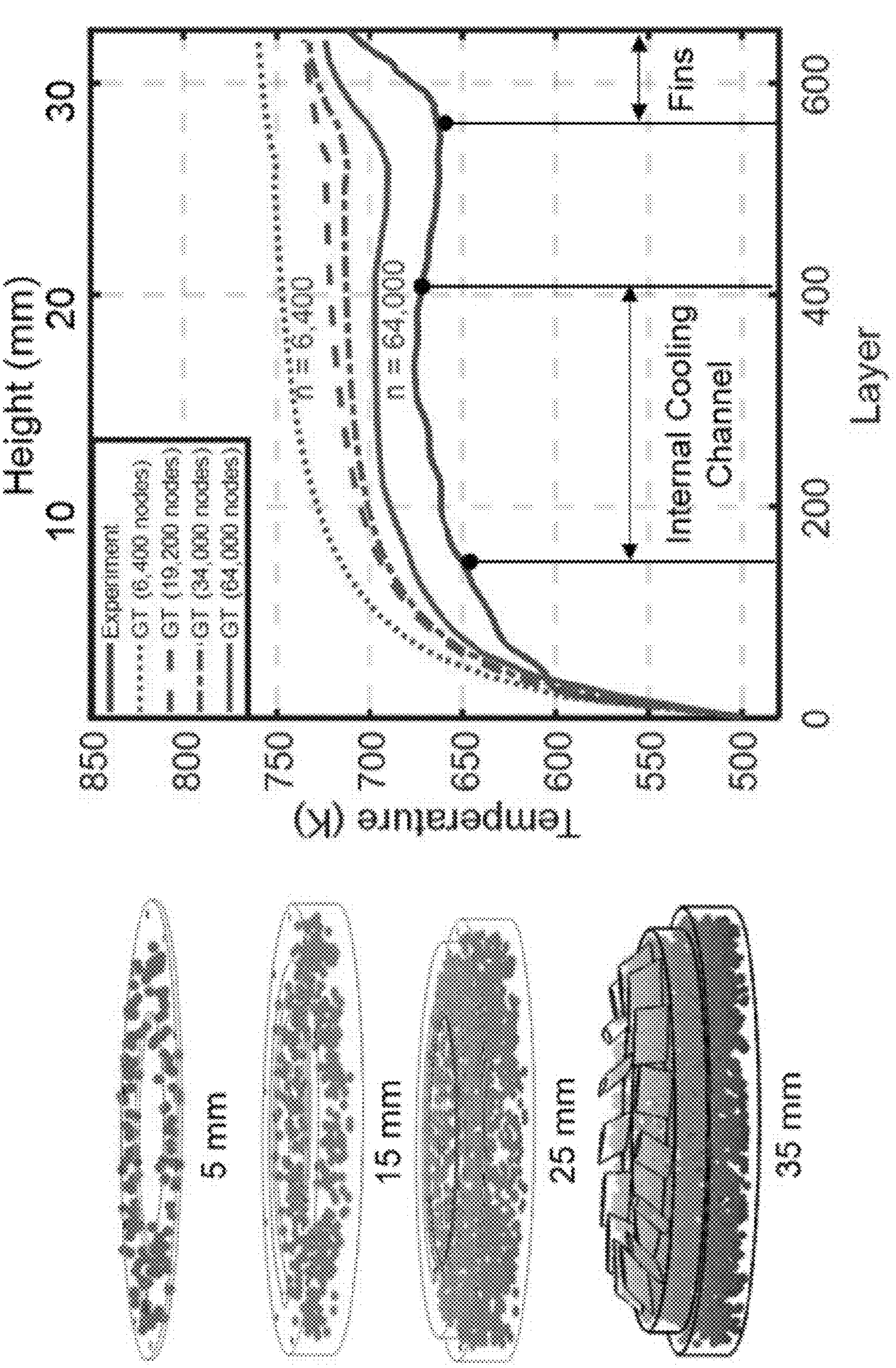
FIG. 13 depicts a comparison of the predicted top surface temperature from Strategy 1 of FIG. 9 with experimentally observed temperature distribution as a function of number of nodes (n).

FIG. 13 depicts a comparison of the predicted top surface temperature from Strategy 1 of FIG. 9 with experimentally observed temperature distribution as a function of number of nodes (n). FIG. 13 and Table 3 report results for Strategy 1 in the disclosed illustrative example in terms of mean absolute percentage error (MAPE), root mean square error (RMSE, [K]), and computational time as a function of number of nodes. The volume of the whole part V can be ~250,000 mm3, which can require a minimum of n=46,000 nodes based on Eqn. (15). From a computational standpoint, the Laplacian and adjacency matrix can each consist of over 2×109 elements (46,000 rows×46,000 columns). Furthermore, 46,000 eigenvalues and eigenvectors can be computed.

TABLE 3

Comparison of strategy 1 accuracy and computational time for different node densities. The number in the parenthesis indicates the uncertainty (standard deviation) over three independent replications.

| Number of Nodes (n) | MAPE (Std. Dev. Over three repetitions) | RMSE (Std. Dev. Over three repetitions) [K] | Time (minutes) |
|---|---|---|---|
| 3,200 | 55.2 (4.7) | 170.4 (19.8) | 2 |
| 6,400 | 36.1 (2.6) | 110.8 (12.7) | 6 |
| 9,600 | 26.7 (2.3) | 91.2 (10.2) | 16 |
| 19,200 | 25.4 (1.9) | 89.6 (8.6) | 39 |
| 25,600 | 22.8 (2.1) | 68.4 (8.2) | 53 |
| 34,000 | 14.7 (1.9) | 53.7 (7.5) | 236 |
| 64,000 | 13.6 (1.8) | 46.2 (7.4) | 634 |

Strategy 1 resulted in ~14% MAPE and 47 K RMSE with 64,000 nodes, and required 10.5 hours of computation time. The desktop computer used in this illustrative example had 128 gigabytes of memory with maximum capacity of ~70, 000 nodes. Therefore, increasing the number of nodes beyond 64,000 overwhelmed the memory of the desktop computer.

While Strategy 1 captures the overall trend in steady state temperature distribution, the prediction error can be large for sections with the internal channel and fins. The main reason for this error is due to short-circuiting of edges across the cooling channel and between the fin and bulk part as depicted in FIG. 10. Accordingly, a large number of nodes are need for Strategy 1. An alternative can be to thread the computation through a GPU using a compiled language, such as C++.

Figure 14:
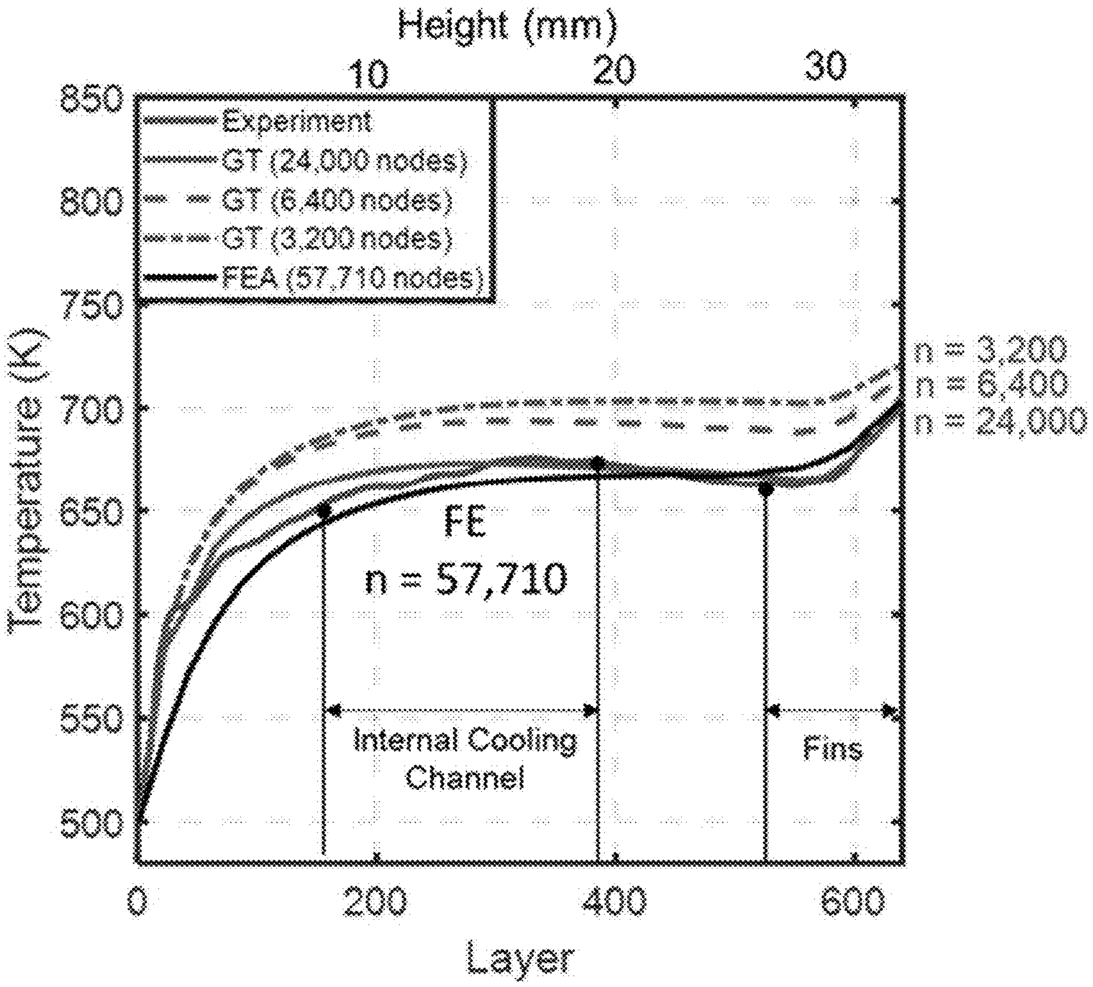
FIG. 14 depicts results from Strategy 2 of FIG. 11 to simulate a sector of the part layer by layer as a function of the number of nodes.
Figure 14:
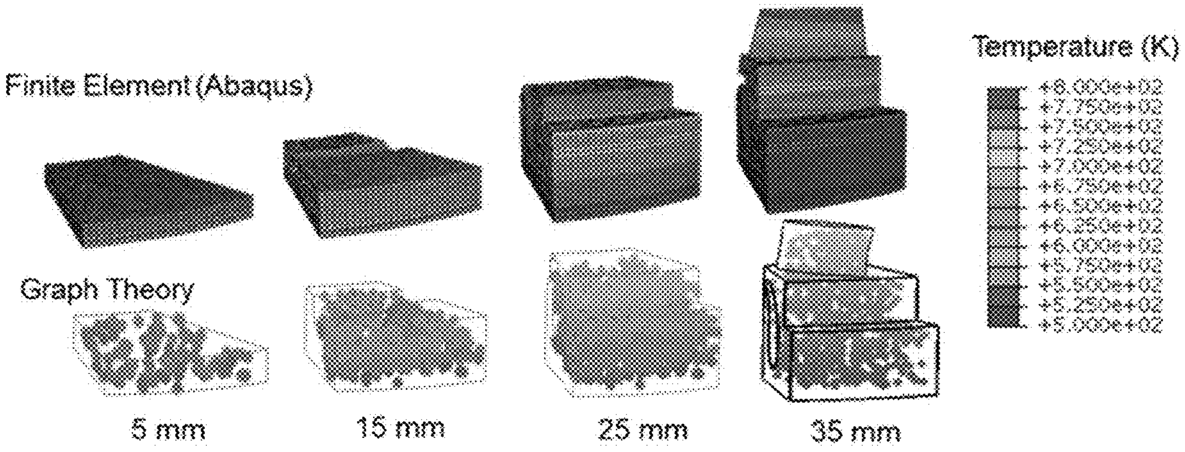

FIG. 14 depicts results from Strategy 2 of FIG. 11 to simulate a sector of the part layer by layer as a function of the number of nodes. With n=24,000, the graph theory predictions converge to within 3.5% (MAPE) and 12 K (RMSE) of the experimental measurements within 41 minutes. The FE approach can use 57,710 nodes for a 9% MAPE and 29 K RMSE, and can converge in 273 minutes (4.5 hours). FIG. 14 also depicts a qualitative comparison of the graph theory and finite element solution for Strategy 2. The graph theory approach can use about ⅕$^{th}$ of the time of FE analysis (using DFLUX routine in Abacus) to provide a similar level of accuracy.

In Strategy 2, a representative radial slice of the part can be simulated. The results for Strategy 2 are shown in FIG. 14 and Table 4.

TABLE 4

Comparison of strategy 2 accuracy and computational time for different node densities. The number in the parenthesis indicates the uncertainty (standard deviation) over three independent replications.

| Nodes | MAPE (Std. Dev. Over three repetitions) | RMSE (Std. Dev. Over three repetitions) [K] | Time (min) |
|---|---|---|---|
| Graph Theory | | | |
| 38,000 | 3.4 (0.3) | 11.6 (2.0) | 106 |
| 24,000 | 3.5 (0.3) | 11.8 (2.4) | 41 |
| 12,800 | 7.9 (0.6) | 27.5 (3.6) | 21 |
| 11,200 | 8.6 (0.9) | 28.1 (3.2) | 17 |
| 9,600 | 9.1 (0.9) | 30.0 (4.1) | 14 |

TABLE 4-continued

Comparison of strategy 2 accuracy and computational time for different node densities. The number in the parenthesis indicates the uncertainty (standard deviation) over three independent replications.

| Nodes | MAPE (Std. Dev. Over three repetitions) | RMSE (Std. Dev. Over three repetitions) [K] | Time (min) |
|---|---|---|---|
| Graph Theory | | | |
| Finite Element | | | |
| 6,400 | 10.1 (1.1) | 33.2 (4.9) | 5 |
| 57,710 | 8.4 | 29.4 | 273 |

Since the volume of the sector chosen (31,000 mm$^3$) is a fraction of the entire part volume (250,000 mm$^3$), the sector can be more densely populated with nodes compared to Strategy 1 (e.g., refer to FIG. 9), which can provide more accurate results with fewer number of nodes.

For Strategy 2, from Eqn. (15) (e.g., refer to FIG. 11), it can be estimated that n=5,800 and above can be needed to capture the trends. In an illustrative example, with 6000 nodes, thermal trends can be predicted with MAPE ~10%, RMSE 33 K in less than 5 minutes. There can be a diminishing return on accuracy with an increase in number of nodes. With 24,000 nodes, for example, the graph theory approach can use about 40 minutes to converge to a MAPE and RMSE of 3.5% and 11.8 K, respectively. A tradeoff can be found at 11,200 nodes, for which the simulation converges to 8.6% (MAPE) and 29 K (RMSE) in less than 18 minutes.

Moreover, as shown in Table 4, graph theory solution can be compared with an FE analysis. To reach a similar level of MAPE (<9%) and RMSE (<30 K), the graph theory approach used 11,200 nodes and 17 minutes of computation, while the FE analysis uses 57,710 nodes and 273 minutes. A qualitative comparison of the FE and graph theory solutions is depicted in FIG. 15.

Figure 15:
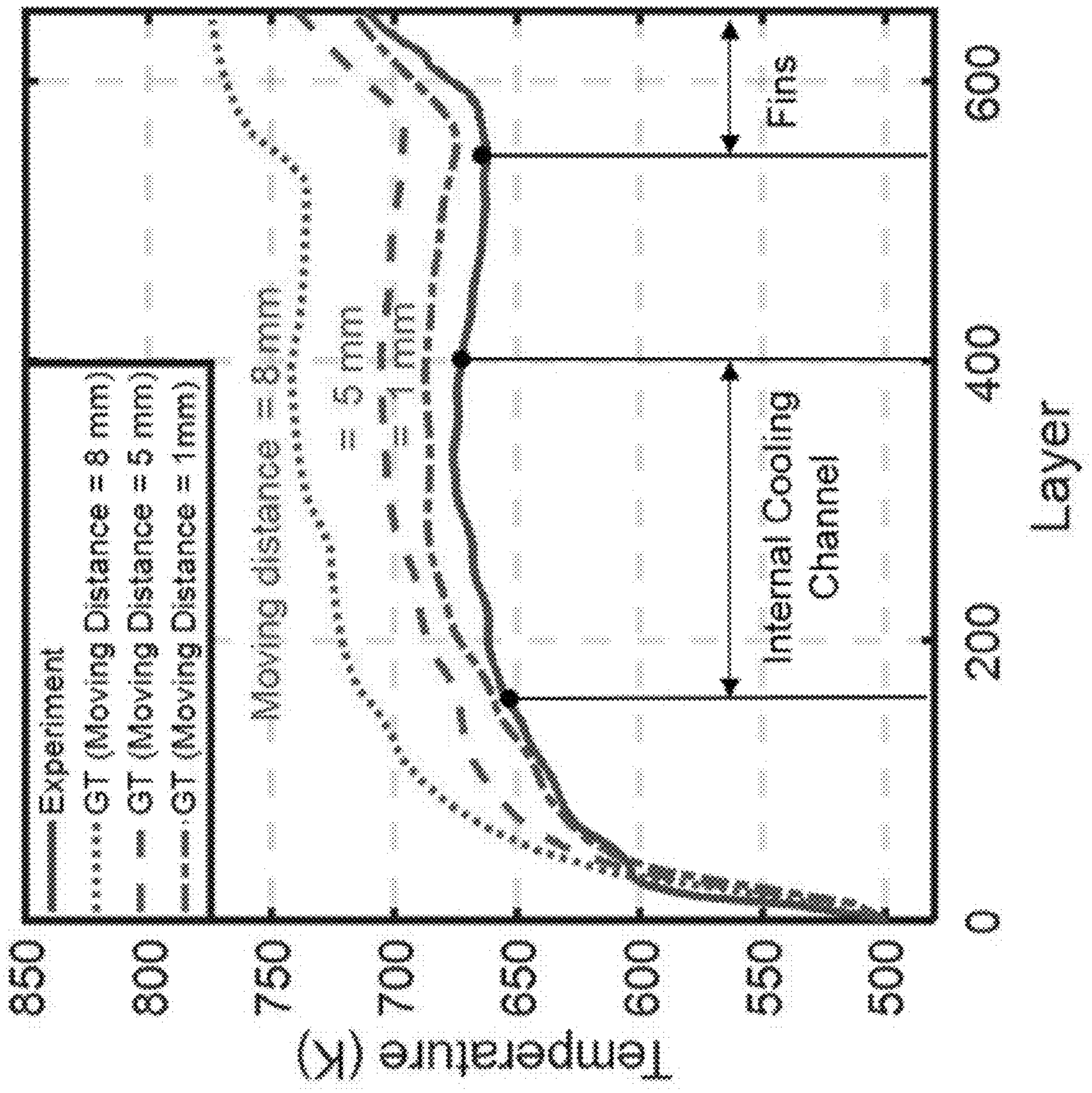
FIG. 15 depicts a comparison of experimental top surface temperature with predicted top surface temperature from Strategy 3 of FIG. 12 at a constant number of nodes, n=10,000.

FIG. 15 depicts a comparison of experimental top surface temperature with predicted top surface temperature from Strategy 3 of FIG. 12 at a constant number of nodes, n=10,000. The results for Strategy 3 (e.g., refer to FIG. 12) are reported in Table 5 and FIG. 15. Table 5 summarizes results from varying the moving distance (height of nodes eliminated), and different number of nodes used for the coarse estimation of temperature at the interface nodes in in Step 1 (e.g., refer to FIG. 9) of the approach.

TABLE 5

Results from applying strategy 3 with different node densities and window size. The number in the parenthesis indicates the uncertainty (standard deviation) over three independent replications.

| Moving Distance | Number of Nodes (n) for coarse estimation (Step 1) | Nodes in each sub-section in Step 2 | MAPE (Std. Dev. Over three repetitions) | RMSE (Std. Dev. Over three repetitions) [K] | Computation time for coarse estimation (Step 1) (min) | Computation time for Steps 4 and 5 (min) | Total Time (min) |
|---|---|---|---|---|---|---|---|
| 8 mm | 6400 | 5000 | 43.5 (4.1) | 117.2 (16.8) | 6 | 5 | 11 |
| 5 mm | | | 16.9 (3.5) | 64.2 (7.7) | | 7 | 13 |
| 2 mm | | | 9.5 (0.8) | 30.5 (4.8) | | 11 | 17 |
| 1 mm | | | 8.1 (0.9) | 25.7 (3.8) | | 16 | 22 |
| 8 mm | | 10000 | 41.8 (3.7) | 109.3 (13.5) | | 9 | 15 |
| 5 mm | | | 15.3 (2.8) | 60.4 (7.2) | | 15 | 21 |
| 2 mm | | | 7.9 (0.8) | 23.8 (4.0) | | 21 | 27 |
| 1 mm | | | 6.1 (0.8) | 22.7 (3.7) | | 33 | 39 |

In an illustrative example, the minimum number of nodes per subsection of 10 mm was estimated from Eqn. (15) as follows. The finest feature, prone to short-circuiting are the fin-shaped features, whose total volume amounted to V=26,500 mm$^3$. With characteristic length l=3 mm, and the number of neighboring nodes $\eta$=5, the number of nodes to avoid short-circuiting in the fin section of the part was estimated as n=5,000.

With n=5000, and moving distance set at 2 mm and lesser, Strategy 3 (e.g., refer to FIG. 12) predicted the top surface temperature with error within 10% (MAPE) and 35 K (RMSE) in approximately 20 minutes. Doubling the number of nodes in each subsection to n=10,000, and maintaining the same moving distance resulted in reduction of MAPE to ~8%, and RMSE less than 25 K.

FIG. 15 shows that Strategy 3 (e.g., refer to FIG. 12) captured subtle temperature trends characteristic of the internal cooling channel and fins. The moving distance can impact the prediction error; a shorter moving distance can result in fewer nodes being removed, and hence there can be a smoother transition between each subsection. A smaller moving distance may, in some implementations, increase the computational time as more nodes are needed to be stored in memory. The total computation time reported in Table 5 includes time required for coarse estimation using Strategy 1 (e.g., refer to FIG. 9).

Figure 16:
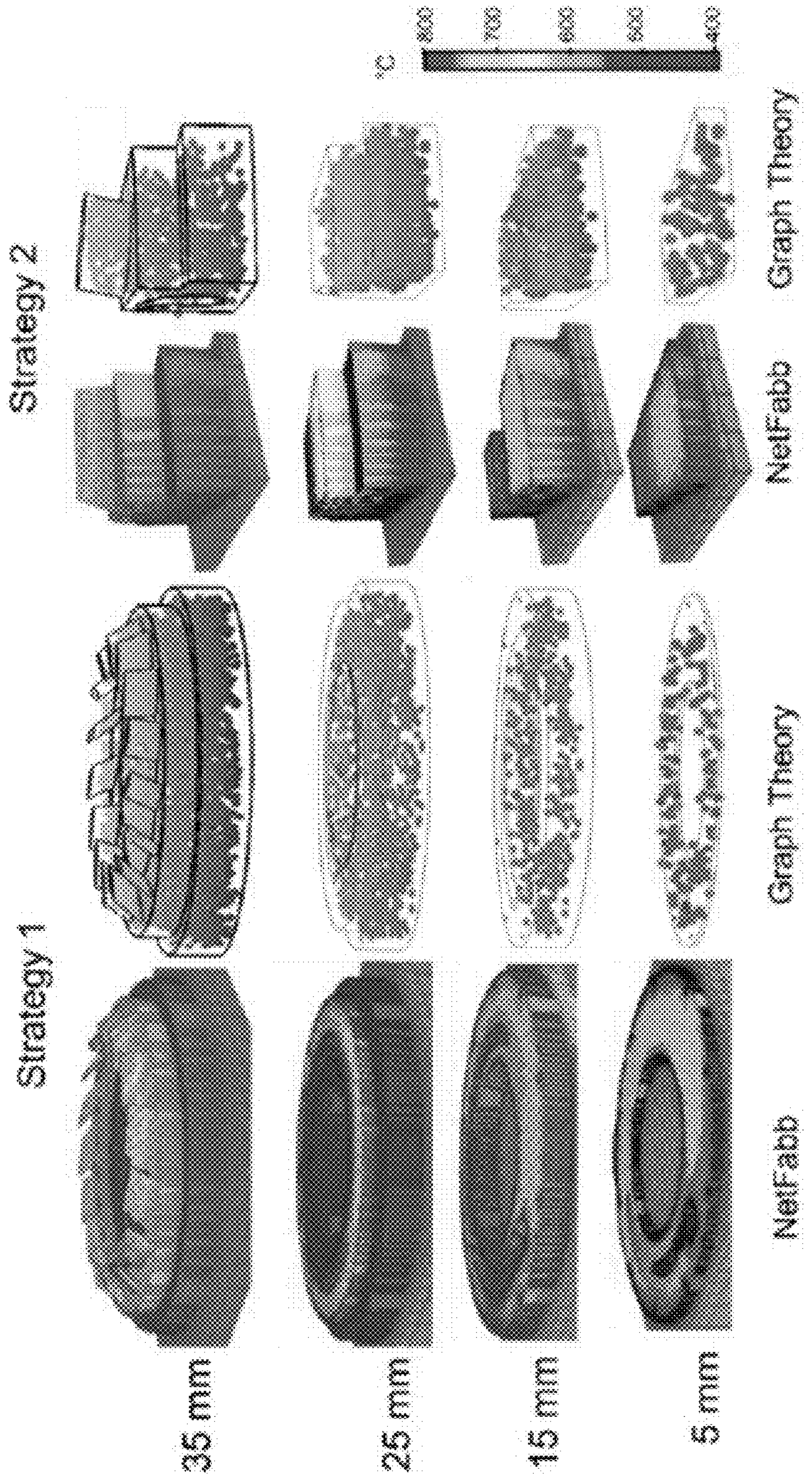
FIG. 16 illustrates a qualitative comparison of the graph theory approach of FIGS. 9 and 11 showing that heat can tend to accumulate in a fin region.

FIG. 16 illustrates a qualitative comparison of the graph theory approach of FIGS. 9 and 11 showing that heat can tend to accumulate in a fin region. Disclosed herein is a qualitative comparison of graph theory results with a commercial AM simulation software Autodesk Netfabb. Commercial simulation packages can use a proprietary approach for adaptive meshing. The user may not be able to control the number of elements in the software package except to choose between three simulation modes labeled fastest, medium, and accurate. Accordingly, it may not be possible to interrogate the temperature at specific locations. The comparison of the Netfabb solution with the graph theory shown in FIG. 16 is intended to be qualitative in nature.

Results from Strategy 1 (n=19,200) (e.g., refer to FIG. 9) and Strategy 2 (n=12,800) (e.g., refer to FIG. 11) can be qualitatively compared with graph theory at specific build heights, as shown in FIG. 16. The graph theory results and Netfabb simulations both predicted heat accumulation in the fin region, and fast diffusion in the annulus. For both scenarios, the Netfabb simulation was set on the fastest mode.

The present disclosure provides for scaling the graph theory approach for predicting the thermal history of a large stainless steel impeller part made using the laser powder bed fusion process (LPBF). As described herein, the impeller had an outside diameter of 155 mm and a vertical height of 35 mm (250,000 $mm^3$). The part was built on a Renishaw AM250 commercial LPBF system, and required the melting of 700 layers over 16 hours of build time. During the build, temperature readings of the top surface of the part were acquired using an infrared thermal camera operating in the longwave infrared range (7 μm to 13 μm).

Strategy 1, as described in reference to FIG. 9, involved populating the entire part with nodes and constructing a network graph over these nodes. This strategy can be computationally intensive for large parts as many graph nodes may be stored in memory. For simulating the impeller part using Strategy 1, results were obtained in 10.5 hours and required 64,000 nodes; the mean absolute percentage error (MAPE) and root mean square error (RMSE) were ~14% and 47 K, respectively.

Strategy 2, as descried in reference to FIG. 11, scaled the part geometry by simulating a small representative radial cross section of the impeller. With 6,400 nodes, the Strategy 2 resulted in a MAPE ~10% and RMSE 32 K within 5 minutes of computation. This approach can be suitable for symmetrical parts. Doubling the number of nodes to 12,800 reduces the MAPE and RMSE to ~8% and 27.5 K, at the cost of computation time, which can increase to ~22 minutes.

Strategy 3, described in reference to FIG. 12, used a moving window approach to simulate the thermal history in horizontal subsections. Instead of discretizing the entire part into nodes and building a large network graph to cover all the nodes in the part as in Strategy 1, the part in Strategy 3 was divided into horizontal subsections. The thermal history of the part was progressively predicted subsection-by-subsection, and to keep the computation tractable and avoid overwhelming the memory of the computer, the nodes in prior subsections were removed. With number of nodes set at 5000 per section, this strategy resulted in a MAPE less than 10% and RMSE less than 30 K within 25 minutes of simulation. The MAPE and RMSE decreased slightly to ~8% and 25 K when the number of nodes was doubled to 10,000, at the cost of computation time, which increased from 30 to 40 minutes.

The graph theory approach can also be used for prediction and prevention of build failures in LPBF. For example, in some implementations, an approach to mitigate flaw formation can include controlling a cooling rate by varying the processing parameters between layers. Such an adaptive layer-wise melting strategy can be valuable when processing fine features, akin to the fin-shaped section of the impeller exemplified herein, which tend to accumulate heat. These between layer changes to the processing parameters can be informed based on the graph theory thermal model, as opposed to trial-and-error. As another example, thermal history predictions can be incorporated from graph theory with real-time in-process sensor data in a machine learning model to predict flaw formation.

Figure 17:
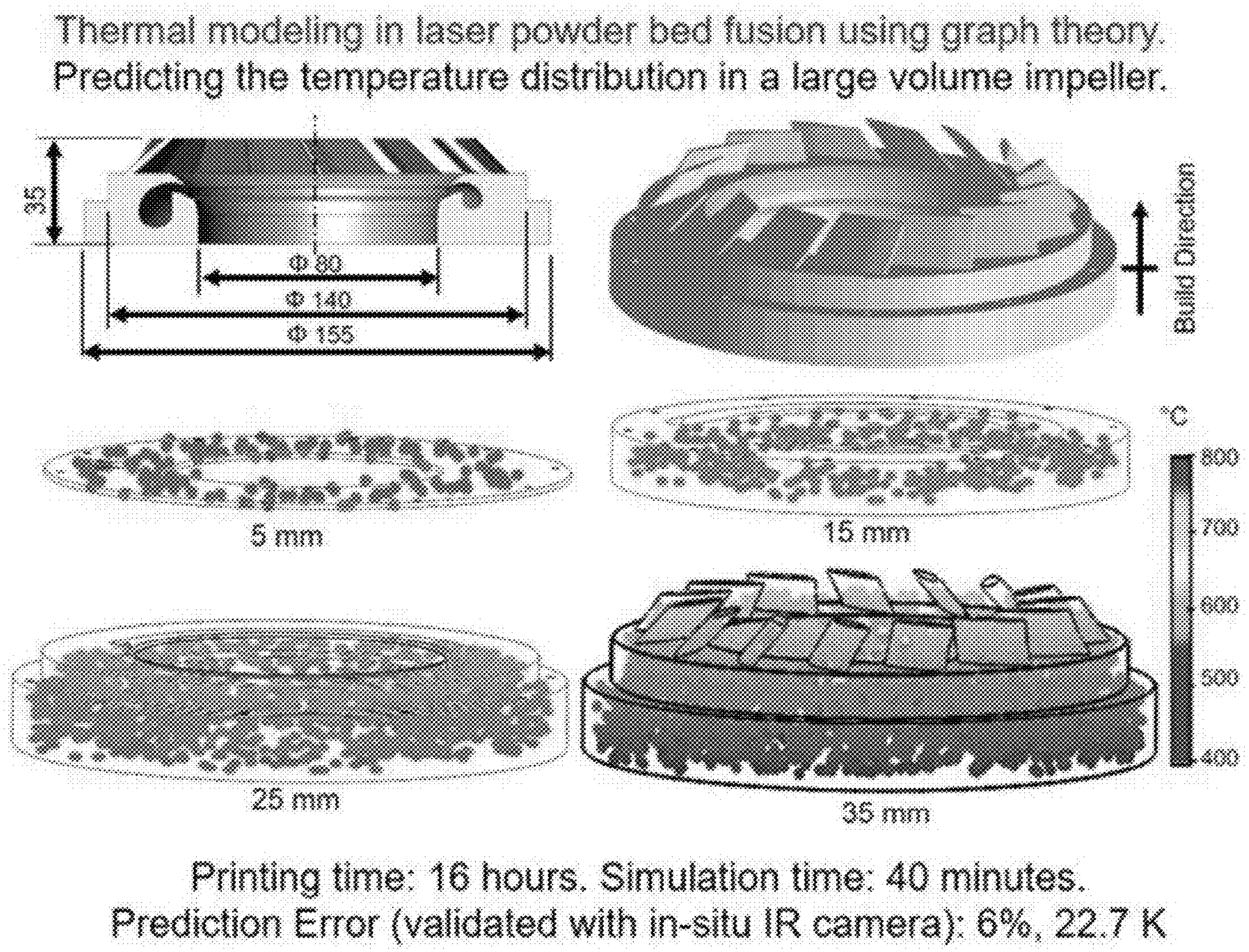
FIG. 17 illustrates predictions of temperature distribution in the part referenced herein.

FIG. 17 illustrates predictions of temperature distribution in the part referenced herein. FIG. 17 demonstrates thermal modeling in LPBF using graph theory, as described herein. A large volume impeller, such as the part described throughout this disclosure, can be built up. Each added layer can be a different size and have different temperature values as the part is being build. For example, when the build process begins and a first region is laid down, the part can be at 5 mm of the max height of 35 mm. The first region can include many layers. The first region can also have a lower predicted temperature distribution. As more layers are added such that the part reaches 15 mm, the temperature distribution is predicted to increase, especially closer to the top surface of the part. As more layers are added such that the part reaches 25 mm, the temperature distribution is predicted to increase closer to the top surface. Finally, once the part reaches 35 mm, the top portion of the part can have the highest temperature distribution while areas closer to the bottom surface of the part have cooled and therefore have the lowest temperature distribution. In this example, the temperature is measured in Celsius and the temperature range can be 400 C-800 C. As described throughout this disclosure, the printing time can be 16 hours while the simulation time can be 40 minutes when using the graph theory techniques described herein. The prediction error, validated with in-situ IR camera, can be 6%, 22.7 K.

Figure 18:
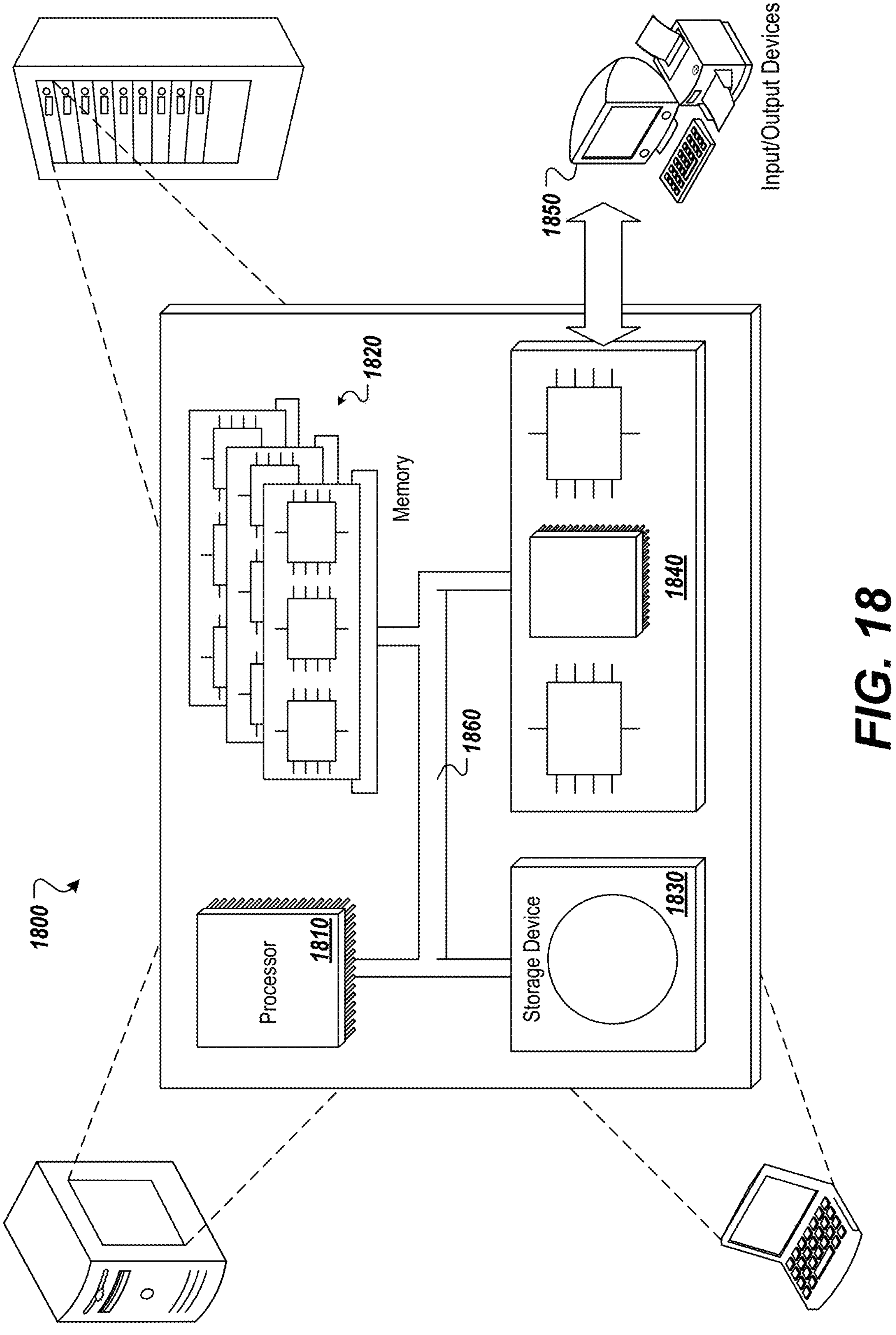
FIG. 18 depicts an example computing system, according to implementations of the present disclosure.

FIG. 18 depicts an example computing system, according to implementations of the present disclosure. The system 1800 may be used for any of the operations described with respect to the various implementations discussed herein. The system 1800 may include one or more processors 1810, a memory 1820, one or more storage devices 1830, and one or more input/output (I/O) devices 1850 controllable via one or more I/O interfaces 1840. The various components 1810, 1820, 1830, 1840, or 1850 may be interconnected via at least one system bus 1860, which may enable the transfer of data between the various modules and components of the system 1800.

The processor(s) 1810 may be configured to process instructions for execution within the system 1800. The processor(s) 1810 may include single-threaded processor(s), multi-threaded processor(s), or both. The processor(s) 1810 may be configured to process instructions stored in the memory 1820 or on the storage device(s) 1830. For example, the processor(s) 1810 may execute instructions for the various software module(s) described herein. The processor(s) 1810 may include hardware-based processor(s) each including one or more cores. The processor(s) 1810 may include general purpose processor(s), special purpose processor(s), or both.

The memory 1820 may store information within the system 1800. In some implementations, the memory 1820 includes one or more computer-readable media. The memory 1820 may include any number of volatile memory units, any number of non-volatile memory units, or both volatile and non-volatile memory units. The memory 1820 may include read-only memory, random access memory, or both. In some examples, the memory 1820 may be employed as active or physical memory by one or more executing software modules.

The storage device(s) 1830 may be configured to provide (e.g., persistent) mass storage for the system 1800. In some implementations, the storage device(s) 1830 may include one or more computer-readable media. For example, the storage device(s) 1830 may include a floppy disk device, a hard disk device, an optical disk device, or a tape device. The storage device(s) 1830 may include read-only memory, random access memory, or both. The storage device(s) 1830 may include one or more of an internal hard drive, an external hard drive, or a removable drive.

One or both of the memory 1820 or the storage device(s) 1830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1800. In some implementations, the CRSM may include a data store that provides storage of computer-readable instructions or other information in a non-transitory format. The CRSM may be incorporated into the system 1800 or may be external with respect to the system 1800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1810 and the memory 1820 may be supplemented by, or incorporated into, one or more application-specific integrated circuits (ASICs).

The system 1800 may include one or more I/O devices 1850. The I/O device(s) 1850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1850 may also include one or more output devices such as a display, LED(s), an audio output device (e.g., a speaker), a printer, a haptic output device, and so forth. The I/O device(s) 1850 may be physically incorporated in one or more computing devices of the system 1800, or may be external with respect to one or more computing devices of the system 1800.

The system 1800 may include one or more I/O interfaces 1840 to enable components or modules of the system 1800 to control, interface with, or otherwise communicate with the I/O device(s) 1850. The I/O interface(s) 1840 may enable information to be transferred in or out of the system 1800, or between components of the system 1800, through serial communication, parallel communication, or other types of communication. For example, the I/O interface(s) 1840 may comply with a version of the RS-232 standard for serial ports, or with a version of the IEEE 1284 standard for parallel ports. As another example, the I/O interface(s) 1840 may be configured to provide a connection over Universal Serial Bus (USB) or Ethernet. In some examples, the I/O interface(s) 1840 may be configured to provide a serial connection that is compliant with a version of the IEEE 1394 standard.

The I/O interface(s) 1840 may also include one or more network interfaces that enable communications between computing devices in the system 1800, or between the system 1800 and other network-connected computing systems. The network interface(s) may include one or more network interface controllers (NICs) or other types of transceiver devices configured to send and receive communications over one or more communication networks using any network protocol.

Computing devices of the system 1800 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Figure 19A:
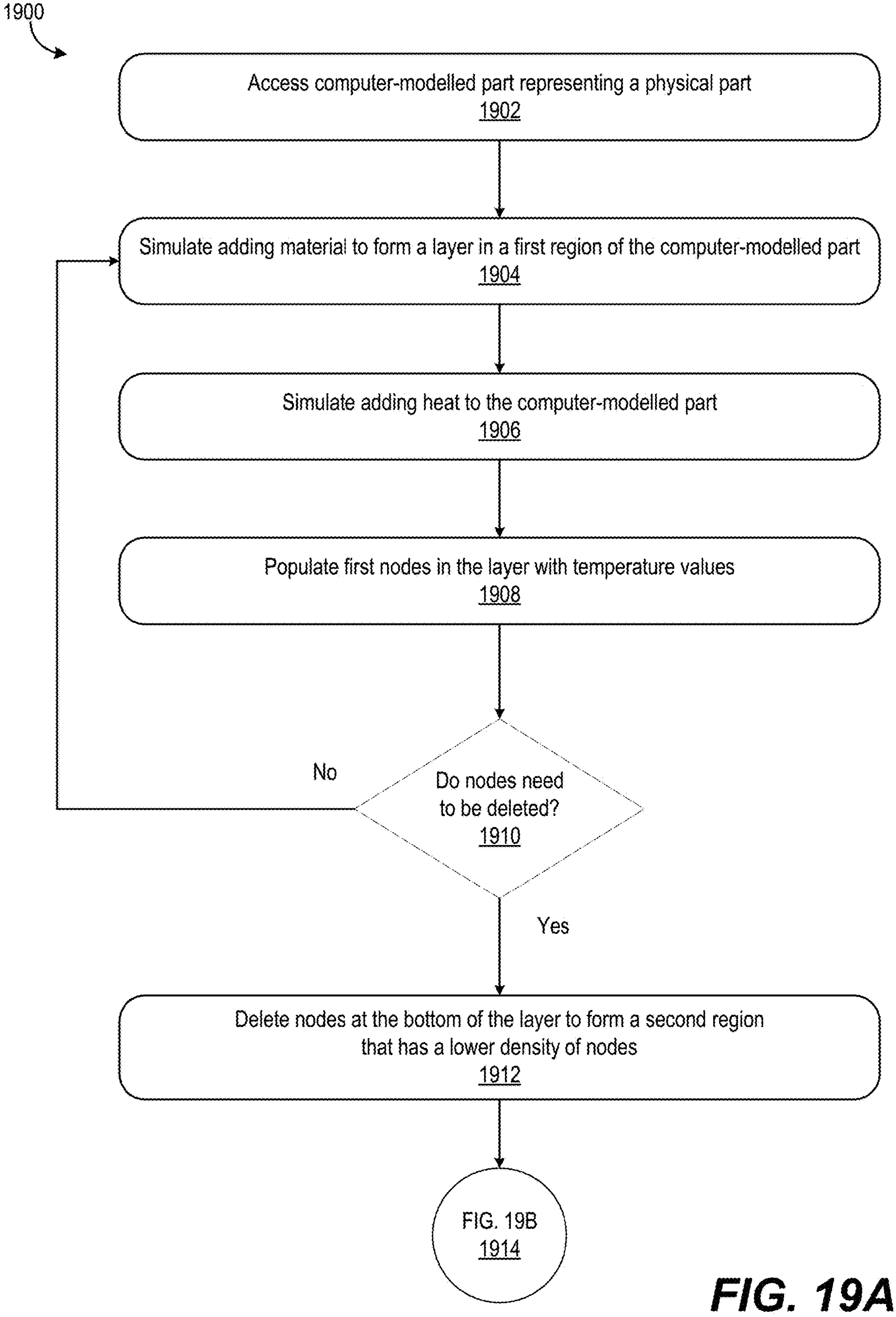
FIGS. 19A-C is a flowchart of a process for Strategy 3 of FIG. 12.
Figure 19B:
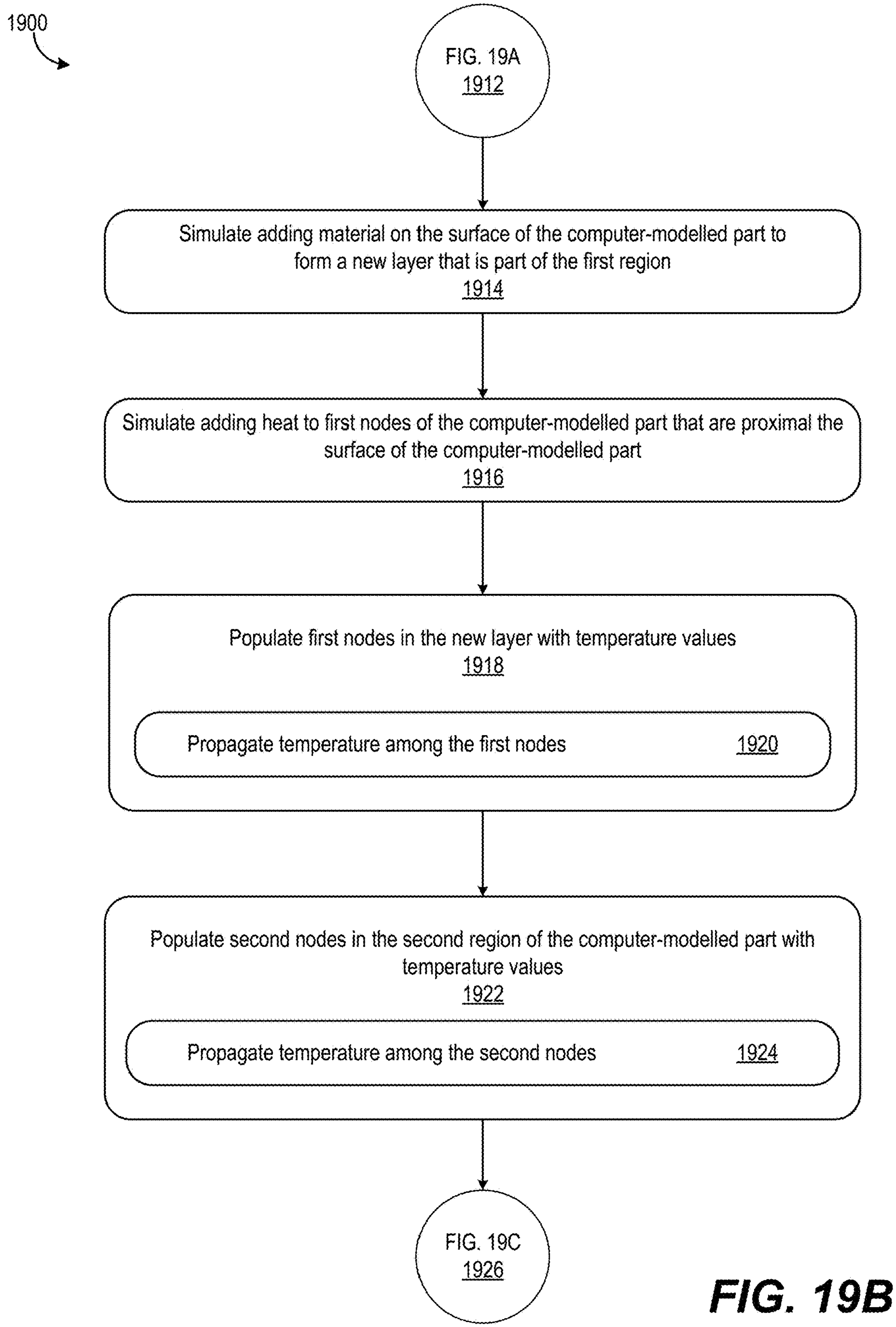
Figure 19C:
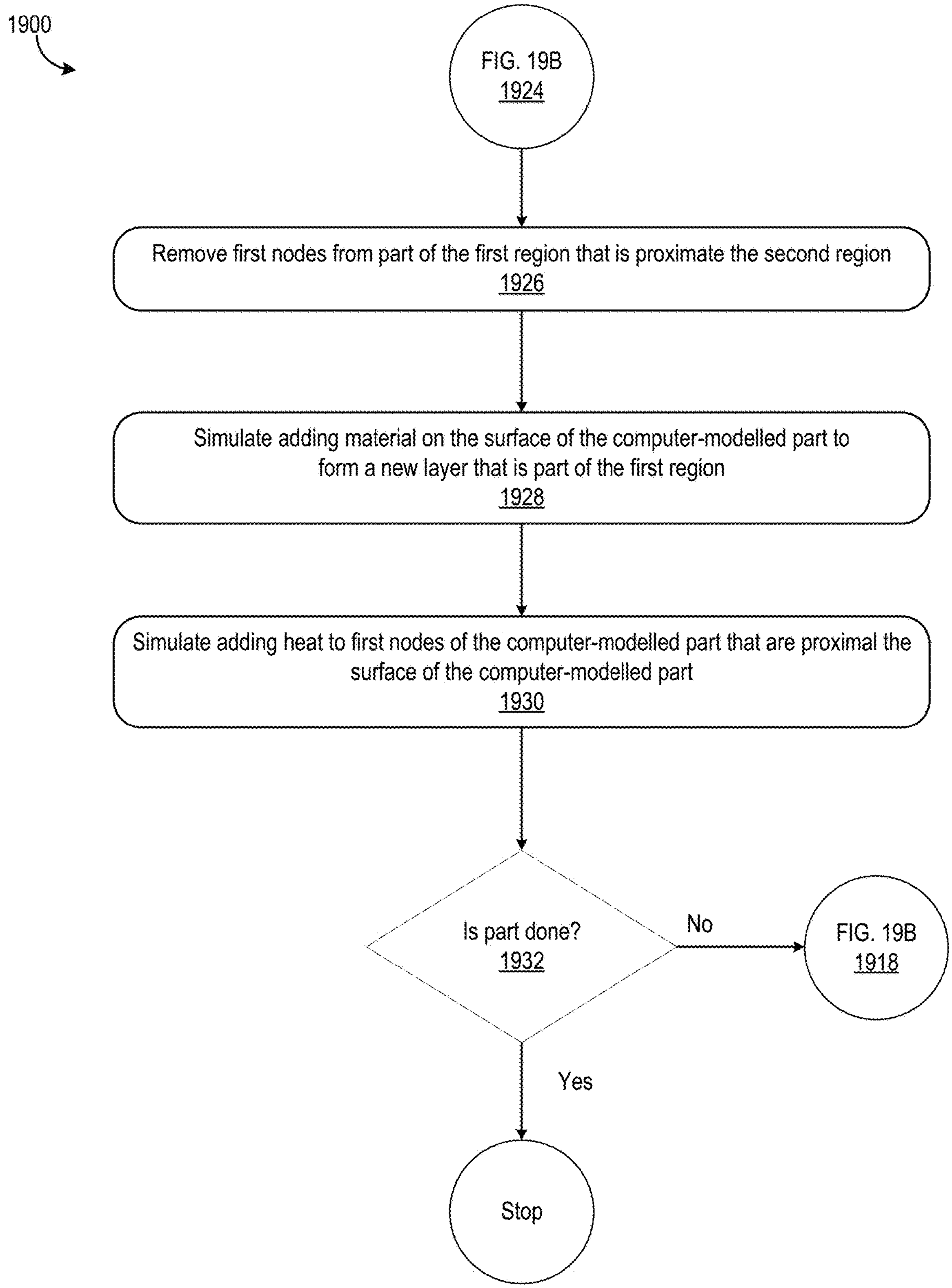

FIGS. 19A-C is a flowchart of a process 1900 for Strategy 3 of FIG. 12. The process 1900 can be a computer-implemented method for simulating temperature during an additive manufacturing process, as described herein. The process 1900 can be used to model a part having two regions with different node densities, although multiple regions with progressively different node densities can be performed (as can be a continuously changing distribution of densities). As layers or material are added to the part, nodes in the high density region that are distal the surface at which material is being added can be removed to free up computer memory and to have more space (e.g., height) to add additional layers to a top of the high density region. When nodes are removed, associated mathematic computations, algorithms, and other information are deleted, thereby freeing up computer memory to add and process additional layers.

Referring to the FIGS. 19A-C, the process 1900 can begin by a computing system accessing a computer-modelled part representing a physical part (1902). The physical part can be one to be formed using an additive manufacturing process. The part can be the example impeller described throughout this disclosure, for example in FIG. 12. The computing system may perform an initial distribution of nodes throughout the computer-modelled part, for example creating a model of the part using low-density distribution (see FIG. 12, step 1), and a model of the part using multiple horizontal slices each having a high-density distribution (see FIG. 12, step 2).

Next, the computing system simulates adding material to form a layer in a first region of the computer-modelled part (1904). The layer can be an initial layer of the computer-modelled part on a build plate. The first region can be built on a base plate. Moreover, as described throughout in reference to the process 1900, the first region can be made up of many layers that are progressively formed with laser energy. The first region can be pre-populated with nodes having the first density. In other words, nodes may already exist in the subsections of the computer-modelled part. These nodes, however, may or may not have pre-assigned temperature values and associated computational information.

Simulate adding heat to the computer-modelled part in 1906. For example, a simulated laser can be applied to a top surface of the computer-modelled part to introduce heat into the part, after which heat may propagate through the part. In other words, the computing system can be configured to simulate an addition of heat energy to first nodes of the computer-modelled part that are proximal the surface of the computer-modelled part during the simulation of the additive manufacturing process, due to simulated laser energy contacting the surface of the computer-modelled part. First nodes proximal the surface of the computer-modelled part can have highest temperature values among first nodes and second nodes of the computer-modelled part.

Populate first nodes in the layer with temperature values (1908). In other words, the first nodes within the initial layer of the computer-modelled part that are distributing according to a first density (e.g., high density) can be populated with temperature values. The nodes can already exist in the layer. Therefore, the nodes can be assigned temperature values. The assigned temperature values may be temperature values that update older temperature values as the simulation propagates heat through the part. At this point in the additive manufacturing process, the computer-modelled part has no second region with second nodes that have a second density (e.g., low density) and are populated with temperature values.

In some implementations, the nodes can be updated with temperature values at one or more different steps in the process 1900 as described further below. For example, the first nodes can be populated with temperature values within the first region of the computer-modelled part concurrently with second nodes being populated with temperature values within a second region of the computer-modelled part, while the computer-modelled part is partially formed during the simulation of the additive manufacturing process.

In some implementations, steps 1906 and 1908 can represent the same operation, and are illustrated as separate steps here for reader convenience. Simulating adding heat can include populating the first nodes with temperature values. Likewise, populating the first nodes with temperature values can include simulating adding heat.

It can be determined whether nodes need to be deleted in 1910. The decision to delete nodes from the layer can be based on whether a maximum height of the first region has been reached or is about to be reached. The maximum height may be set by an administrator or may be automatically set (e.g., based on computer memory size). The decision can also be based on whether computer memory is full or is about to be full. If the maximum height of the region has been reached, then nodes can be removed such that height can be opened up to build on additional layers in the region. If computer memory fills up, then the computer may not be capable of handling equations and mathematics associated with adding additional layers to the computer-modelled part. Therefore, nodes are removed such that computer memory can be opened up to build additional layers.

If nodes do not need to be deleted (1910), then 1904-1910 can be repeated, adding another layer with laser energy, until the maximum height is reached and/or the computer memory is full. Thus, layers can be continuously added to the first region and nodes therewithin can be updated with temperature values as temperature flows among the nodes in the simulation (using edges between the nodes, which are discussed in more detail below). The computing system can be configured to not remove first nodes from the first region until the computing system has simulated adding material to progressively form multiple layers on top of the initial layer of the computer-modelled part.

If nodes are to be deleted (1910), then the computing system deletes nodes (1912). As shown in FIG. 12, at step 3, the example maximum height for the region before the computer memory is full is 10 mm. The entire 10 mm region depicted can be the first region and the 2.5 mm sub-regions included therein can each be comprised of many layers added by laser energy. Thus, layers have been added to the first region in step 3 until the first region reaches the maximum height of 10 mm. The topmost layer or layers can be where a laser adds heat.

In the example in FIG. 12, even though the maximum height is reached for the region, more layers need to be added to reach a full height of the part. Therefore, nodes can be deleted at the bottom of the layer or region (1912). Deleting the nodes can form a second region that has a lower density of nodes. As shown in FIG. 12 at step 4.1, nodes in the lowermost layer or layers having a height of x mm can be eliminated or removed from computer memory. Remaining layers have severed edges and a new height of y mm. Now that nodes in the lowermost layer or layers are removed, additional layers can be added to the top layer to fill x mm in height that was removed. In other words, layers can be added until the region reaches either the maximum height of 10 mm or the full height of the part (which would indicate that the part is done/fully built).

Next, simulate adding material on the surface of the computer-modelled part to form a new layer that is part of the first region (1914). One or more layers can be added to the modelled part until the maximum height is reached and/or the computer memory is full. As shown in FIG. 12 in step 5, new layers can be added on top of the high density region (e.g. the first region) until the maximum designated height (e.g., 10 mm) is reached. The process shown in steps 4-5 can then be repeated until the full height of the part is reached (e.g., the part is done/fully built). In some embodiments, deleting nodes can include removing all nodes associated with the model in Step 2 and leaving nodes from a separately model with a "coarse estimate" of the part, as shown in Step 1. In some embodiments, deleting nodes can include removing only part of the nodes associated with the model in Step 2 so that remaining nodes have greater weight and become super nodes that require lesser overall computation (in such embodiments there may be no separate model with a "coarse estimate"). Deleting nodes can include deleting all substantial computational data associated with the nodes but leaving identifiers for the nodes.

Simulate adding heat to first nodes of the computer-modelled part that are proximal the surface of the computer-modelled part, as described herein (1916). Simulating adding heat can include populating or updating the first nodes with temperature values (e.g., refer to 1918). In some implementations, 1916 can be performed before and after 1914. In other implementations, 1916 can be performed only before 1914 or only after 1914.

For example, as shown in FIG. 12 in step 4.2, nodes at a transition layer (e.g., the layer directly above the layer having nodes that were eliminated; the second region as in 1912 and 1922) can be updated with temperature values. The temperature values can be based on similar temperature values from the model of step 1 (e.g., the coarse estimate). In other words, temperature values from the model in step 1 can be taken and mapped onto the nodes in the transition layer. The temperature values can also be based on simulating adding heat directly to the model in step 4.2. In yet other examples, some nodes in the transition layer can be kept while other nodes in the transition layer can be removed. The nodes that are kept can already have temperature values. Those temperature values can then be associated with the transition layer.

Populate first nodes in the new layer with temperature values in 1918, as described herein. Propagate temperature among the first nodes in 1920, as described herein. 1918 and/or 1920 can include populating first nodes within a first region of the computer-modelled part with temperature values, such that each of the first nodes has a corresponding temperature value, the first region of the computer-modelled part having a first density of the first nodes, the first region of the computer-modelled part being proximal a surface of the computer-modelled part at which material is added to the computer-modelled part during a simulation of the additive manufacturing process. As described herein, the first region can be a high density region.

Populate second nodes in the second region of the computer-modelled part with temperature values (1922). Propagate temperature among the second nodes in 1924, as described herein. As shown in FIG. 12 in step 4.2, the lowermost layer that is shown severed from the remaining first region is the lower density second region. Anything beneath the 10 mm chunk can be considered the second region. Temperature values of the lower density second region can be the low density temperature values from the model in step 1. The temperature values of the second region can also be based on temperature values that are already assigned to nodes that are kept within the second region after other nodes have been removed from the region (e.g., temperature values that were assigned at any time throughout 1908 and/or 1916-1924).

In other words, 1922 can include populating second nodes within a second region of the computer-modelled part with temperature values, such that each of the second nodes has a corresponding temperature value, the second region of the computer-modelled part having a second density of the second nodes that is less than the first density of the first nodes in the first region of the computer-modelled part, the second region of the computer-modelled part being distal the surface of the computer-modelled part at which material is added to the computer-modelled part during the simulation of the additive manufacturing process.

As described throughout the process 1900, each region can be formed of multiple progressively-added layers. The first region of the computer-modelled part that has the first density of the first nodes can include multiple first layers of the computer-modelled part that were progressively added to the computer-modelled part by the simulation of the additive manufacturing process. The second region of the computer-modelled part that has the second density of the second nodes can also include multiple second layers of the computer-modelled part that were progressively added to the computer-modelled part by the simulation of the additive manufacturing.

In some implementations, the regions can be horizontal sections (e.g., refer to FIG. 12). The first region of the computer-modelled part can include a first horizontal section of the computer-modelled part that is proximal the surface of the computer-modelled part at which material is added to the computer-modelled part. The second region of the computer-modelled part can include a second horizontal section of the computer-modelled part distal the surface of the computer-modelled part at which material is added to the computer-modelled part. Moreover, the horizontal sections can be adjacent. The first horizontal section of the computer-modelled part can be adjacent the second horizontal section of the computer-modelled part.

Each of the first nodes within the first region of the computer-modelled part can be connected to multiple other nodes with respective edges to form a first network of nodes (which may include multiple disconnected layers, as illustrated in FIG. 12, Step 2). Each of the second nodes within the second region of the computer-modelled part can be connected to multiple other nodes with respective edges to form a second network of edges. Therefore, edges can connect nodes.

The first network of nodes can be provided by a first computer model that models only part of the computer-modelled part with the first density of first nodes (e.g., high density). The second network of nodes can be provided by a second computer model that models all of the computer-modelled part with the second density of second nodes (e.g., low density). Thus, in some implementations, the two regions of the part can have two different models rather than one. The first network of nodes can be unconnected to the second network of second nodes by edges. The computing system can update temperature values for first nodes in the first region that are proximal a boundary between the first region and the second region based on temperature values for second nodes in the second region that are proximal the boundary between the first region and the second region. In other words, the temperature values from the low density region can be used to populate the temperature values in the high density region even if nodes of both regions are not connected by edges.

Additionally, temperature can transfer or flow through the first region and second region via the edges (e.g., when a layer heats a top layer of the first region), as described throughout the process 1900. The temperature can flow through the nodes at varying speeds. Temperature can be propagated among the first nodes of the first network of nodes through by way of edges between various of the first nodes and temperature can be propagated among the second nodes of the second network of nodes through by way of edges between various of the second nodes.

In 1926, remove first nodes from part of the first region that is proximate the second region. Removing the first nodes from the part of the first region that is proximate the second region of the computer-modelled part can free computer memory that enables a computing system to perform the populating of first nodes within a new layer of the computer-modelled part with temperature values, as described further throughout the process 1900. As described herein and in reference to FIG. 12, nodes can be removed from a bottom of the 10 mm chunk in order to free up computer memory and build additional layers at the top surface of the first region. Nodes closest to the bottom of the first region (e.g., the high density region) can be removed. By removing the nodes, the part of the first region that is proximate the second region becomes part of the second region and has the second density of nodes (e.g., the lower density).

Nodes can be removed from the bottom of the high density region by completely removing them such that only low density nodes remain. This can result in two isolated models for the part. Alternatively, instead of having two models for the part, one model can be used, most nodes can be removed from a layer of that model, and lowest density nodes can remain within that layer of the model. Once nodes are removed, the remaining low density nodes can take on an increased weight. In other words, the fewer remaining nodes can have a greater temperature values strength (and may connect to more of the nodes in the first region across the boundary between the first region and the second region). Layers of the regions do not need to be isolated from each other and edges can still connect nodes of the high density region to the low density region.

Simulate adding material on the surface of the computer-modelled part to form a new layer that is part of the first region (1928), as described herein. The new layer of the computer-modelled part being part of the first region and having first nodes that are distributed according to the first density (e.g., the higher density of the first region).

Simulate adding heat to first nodes of the computer-modelled part that are proximal the surface of the computer-modelled part in 1930, as described herein. As mentioned throughout, whenever a new layer is added, the first nodes within the new layer can be populated with temperature values, such that each of the first nodes within the new layer of the computer-modelled part has a corresponding temperature value.

It can be determined whether the part is done in 1932. In other words, has the part been built to completion and/or its full height or shape? If yes, the process 1900 can stop. If no, then 1918-1932 (e.g., refer to step 6 in FIG. 12) can be repeated until the part is done.

Figures 20A, 20B, 20C, 20D:
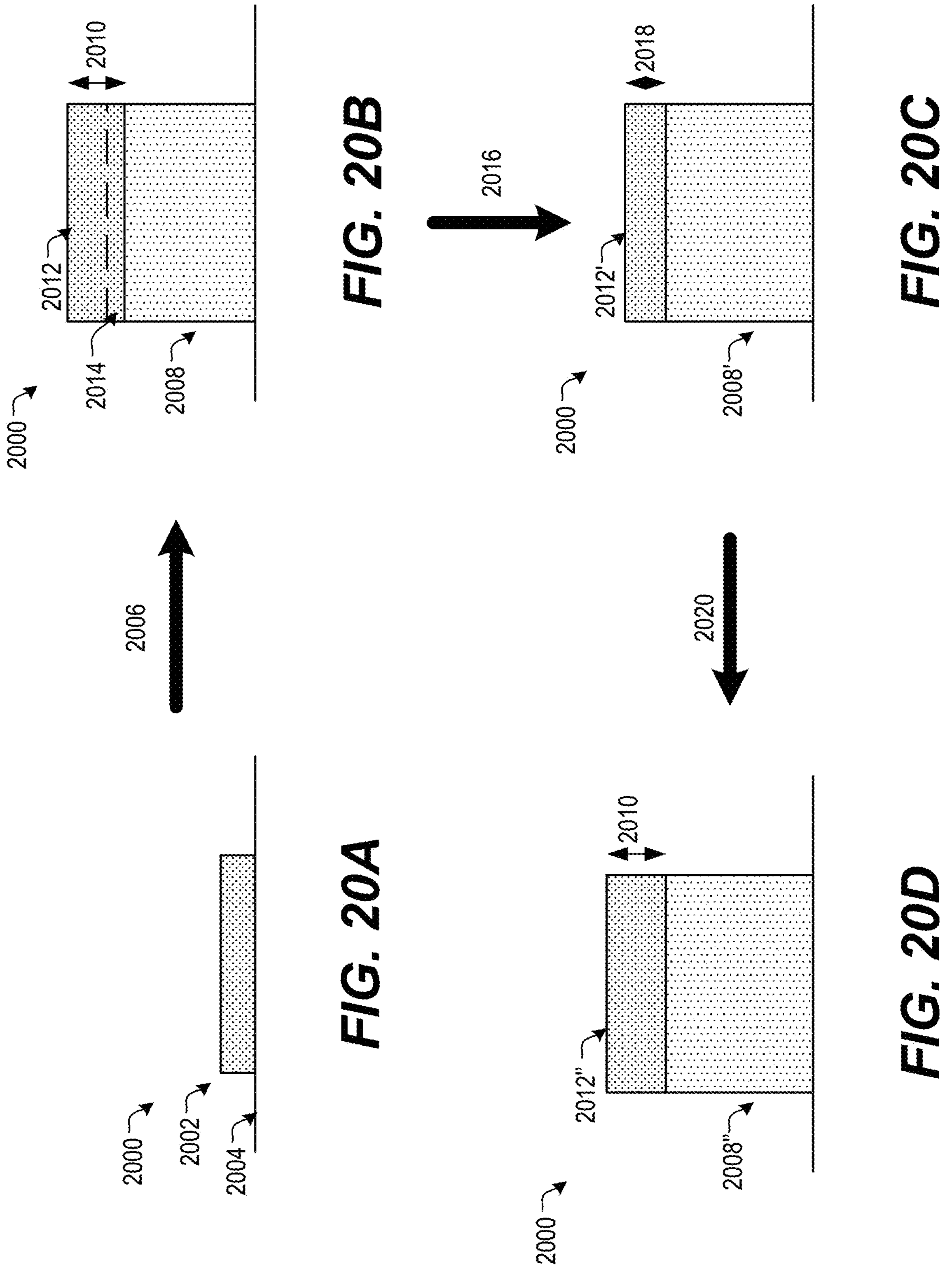
FIGS. 20A-D illustrate Strategy 3 of FIG. 12.

FIGS. 20A-D illustrate Strategy 3 of FIG. 12. FIG. 20A depicts a computer-modelled part 2000 (e.g., refer to FIGS. 12, 19A-C) as it has only a first layer or first region 2002. The first layer 2002 can be an initial layer that is built on a base plate 2004. The layer 2002 can also be made up of many layers. The layer 2002 is depicted as represented with a high density of temperature nodes. The layer 2002 can have an initial height. The height can be any size. For example, as depicted in FIG. 12, the height can be 2.5 mm.

FIG. 20B depicts the computer-modelled part 2000 after multiple layers have been added in a process 2006 and a second region 2008 with a low-density of temperature nodes has been formed. Layers can be added to the top of the computer-modelled part 2000 until a maximum height 2010 of the first region with a high density of temperature nodes is reached. The layer 2012 can be made up of many layers, such as layer 2014 and multiple layers progressively added thereon. As depicted in FIG. 12, the maximum height 2010 can be 10 mm. Since the maximum height 2010 was reached by adding layers, some nodes in the high density first layer 2012 need to be removed to make room for additional layers added on top of the computer-modelled part 2000. Therefore, portion 2014 of the first layer 2012 is indicated as an area where high density nodes of the layer 2012 can be removed such that the density of the portion 2014 can match the low density of the layer 2008 and additional layers can be added.

FIG. 20C depicts a first region 2012' and a second region 2008' with a height 2018 as in FIG. 20B. Since nodes in the portion 2014 are removed 2016, the first region 2012' now has a smaller height 2018. In other words, the second region 2008' can enclose the portion 2014 of FIG. 20B where high density nodes were removed in process 2016.

FIG. 20D depicts adding additional layers to the computer-modelled part 2000 in process 2020. Since nodes were removed from the portion 2014, computer memory freed up and additional layers can be added to the top of the computer modelled part 2000 in a first region 2012" until the maximum height 2010 of the first region (e.g., 10 mm) is reached. Layers may not be added to a second region 2008", so the second region 2008" can remain at the same height as it was in FIG. 20C. Once the maximum height of the first region is reached, the process described herein (e.g., refer to FIGS. 12 and 19A-C) can be repeated (e.g., FIGS. 20B-D).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for simulating temperature during an additive manufacturing process, the method comprising:

accessing, by a computing system, a computer-modelled part representing a physical part to be formed using an additive manufacturing process, wherein the computer-modelled part comprises first nodes within a first region of the computer-modelled part and second nodes within a second region of the computer-modelled part, and wherein the first nodes are unconnected to the second nodes by edges;

populating, by the computing system, the first nodes within the first region of the computer-modelled part with temperature values, such that each of the first nodes has a corresponding temperature value, the first region of the computer-modelled part having a first density of the first nodes, the first region of the computer-modelled part being proximal a surface of the computer-modelled part at which material is added to the computer-modelled part during a simulation of the additive manufacturing process;

populating, by the computing system, the second nodes within the second region of the computer-modelled part with temperature values, such that each of the second nodes has a corresponding temperature value, the second region of the computer-modelled part having a second density of the second nodes that is less than the first density of the first nodes in the first region of the computer-modelled part, the second region of the computer-modelled part being distal the surface of the computer-modelled part at which material is added to the computer-modelled part during the simulation of the additive manufacturing process;

removing, by the computing system, first nodes from part of the first region that is proximate the second region, so that the part of the first region that is proximate the second region becomes part of the second region and has the second density of nodes;

simulating, by the computing system as part of the simulation of the additive manufacturing process, adding material on the surface of the computer-modelled part to form a new layer of the computer-modelled part, the new layer of the computer-modelled part being part of the first region and having first nodes that are distributed according to the first density; and populating, by the computing system, the first nodes within the new layer of the computer-modelled part with temperature values based on temperature values of the second nodes unconnected to the first nodes by edges.

2. The computer-implemented method of claim 1, wherein the first nodes are populated with temperature values within the first region of the computer-modelled part concurrently with the second nodes being populated with temperature values within the second region of the computer-modelled part, while the computer-modelled part is partially formed during the simulation of the additive manufacturing process.

3. The computer-implemented method of claim 1, wherein removing the first nodes from the part of the first region that is proximate the second region frees computer memory that enables the computing system to perform the populating of the first nodes within the new layer of the computer-modelled part with temperature values.

4. The computer-implemented method of claim 1, wherein:

each of the first nodes within the first region of the computer-modelled part is connected to multiple other nodes with respective edges to form a first network of nodes; and each of the second nodes within the second region of the computer-modelled part is connected to multiple other nodes with respective edges to form a second network of nodes.

5. The computer-implemented method of claim 4, comprising:

propagating, by the computing system as part of the simulation of the additive manufacturing process, temperature among the first nodes of the first network of nodes by way of edges between various of the first nodes; and propagating, by the computing system as part of the simulation of the additive manufacturing process, temperature among the second nodes of the second network of nodes by way of edges between various of the second nodes.

6. The computer-implemented method of claim 4, wherein:

the first network of nodes is provided by a first computer model that models only part of the computer-modelled part that has the first density of first nodes; and the second network of nodes is provided by a second computer model, unconnected to the first computer model by edges between nodes, that models all of the computer-modelled part with the second density of second nodes.

7. The computer-implemented method of claim 1, wherein populating the first nodes within the new layer of the computer-modelled part with temperature values based on temperature values of the second nodes unconnected to the first nodes by edges comprises:

updating temperature values of the first nodes within the first region based on temperature values of the second nodes that are proximal a boundary between the first region and the second region.

8. The computer-implemented method of claim 1, wherein the additive manufacturing process comprises a laser powder bed fusion additive manufacturing process.

9. The computer-implemented method of claim 1, wherein the additive manufacturing process comprises a directed energy deposition process.

10. The computer-implemented method of claim 1, wherein:

the first region of the computer-modelled part that has the first density of the first nodes comprises multiple first layers of the computer-modelled part that were progressively added to the computer-modelled part by the simulation of the additive manufacturing process; and the second region of the computer-modelled part that has the second density of the second nodes comprises multiple second layers of the computer-modelled part that were progressively added to the computer-modelled part by the simulation of the additive manufacturing process.

11. The computer-implemented method of claim 1, wherein:

the first region of the computer-modelled part comprises a first horizontal section of the computer-modelled part that is proximal the surface of the computer-modelled part at which material is added to the computer-modelled part; and the second region of the computer-modelled part comprises a second horizontal section of the computer-modelled part distal the surface of the computer-modelled part at which material is added to the computer-modelled part.

12. The computer-implemented method of claim 11, wherein the first horizontal section of the computer-modelled part is adjacent the second horizontal section of the computer-modelled part.

13. The computer-implemented method of claim 1, comprising:

simulating, by the computing system as part of the simulation of the additive manufacturing process, adding material to form an initial layer of the computer-modelled part on a build plate and multiple additional layers progressively added on the initial layer;

populating, by the computing system, first nodes within the initial layer and the multiple additional layers of the computer-modelled part with temperature values, the first nodes within the initial layer and the multiple additional layers of the computer-modelled part being distributed according to the first density, wherein the computer-modelled part has no second region with second nodes that have the second density and are populated with temperature values while the computer-modelled part has only the initial layer and the multiple additional layers; and removing, by the computing system, first nodes that are distributed through at least part of the initial layer and the multiple additional layers to form the second region that has the second density that is lower than the first density.

14. The computer-implemented method of claim 13, wherein:

the computing system is configured to not remove first nodes from the first region until the computing system has simulated adding material to progressively form multiple layers on top of the initial layer of the computer-modelled part.

15. The computer-implemented method of claim 1, comprising:

simulating, by the computing system, an addition of heat energy to first nodes of the computer-modelled part that are proximal the surface of the computer-modelled part during the simulation of the additive manufacturing process, due to simulated laser energy contacting the surface of the computer-modelled part.

16. The computer-implemented method of claim 15, wherein first nodes proximal the surface of the computer-modelled part have highest temperature values among first nodes and second nodes of the computer-modelled part.

17. The computer-implemented method of claim 1, wherein removing the first nodes from the part of the first region that is proximate the second region comprises removing temperature values and computations associated with the removed first nodes and leaving information that identifies the removed first nodes.

18. A computerized system, comprising:

one or more processors; and one or more computer-readable devices including instructions that, when executed by the one or more processors, cause the computerized system to perform operations that include:

accessing a computer-modelled part representing a physical part to be formed using an additive manufacturing process, wherein the computer-modelled part comprises first nodes within a first region of the computer-modelled part and second nodes within a second region of the computer-modelled part, and wherein the first nodes are unconnected to the second nodes by edges;

populating the first nodes within the first region of the computer-modelled part with temperature values, such that each of the first nodes has a corresponding temperature value, the first region of the computer-modelled part having a first density of the first nodes, the first region of the computer-modelled part being proximal a surface of the computer-modelled part at which material is added to the computer-modelled part during a simulation of the additive manufacturing process;

populating the second nodes within the second region of the computer-modelled part with temperature values, such that each of the second nodes has a corresponding temperature value, the second region of the computer-modelled part having a second density of the second nodes that is less than the first density of the first nodes in the first region of the computer-modelled part, the second region of the computer-modelled part being distal the surface of the computer-modelled part at which material is added to the computer-modelled part during the simulation of the additive manufacturing process;

removing first nodes from part of the first region that is proximate the second region, so that the part of the first region that is proximate the second region becomes part of the second region and has the second density of nodes;

simulating, as part of the simulation of the additive manufacturing process, adding material on the surface of the computer-modelled part to form a new layer of the computer-modelled part, the new layer of the computer-modelled part being part of the first region and having first nodes that are distributed according to the first density; and populating the first nodes within the new layer of the computer-modelled part with temperature values based on temperature values of the second nodes unconnected to the first nodes by edges.

19. The system of claim 18, wherein:

each of the first nodes within the first region of the computer-modelled part is connected to multiple other nodes with respective edges to form a first network of nodes;

each of the second nodes within the second region of the computer-modelled part is connected to multiple other nodes with respective edges to form a second network of nodes; and the first network of nodes is unconnected to the second network of second nodes by edges; and the operations further include:

propagating, as part of the simulation of the additive manufacturing process, temperature among the first nodes of the first network of nodes by way of edges between various of the first nodes;

propagating, as part of the simulation of the additive manufacturing process, temperature among the second nodes of the second network of nodes by way of edges between various of the second nodes; and updating temperature values for first nodes in the first region that are proximal a boundary between the first region and the second region based on temperature values for second nodes in the second region that are proximal the boundary between the first region and the second region.

20. A computer-implemented method for simulating temperature during an additive manufacturing process, the method comprising:

accessing, by a computing system, a computer-modelled part representing a physical part to be formed using an additive manufacturing process, wherein the computer-modelled part comprises first nodes within a first region of the computer-modelled part and second nodes within a second region of the computer-modelled part, and wherein the first nodes are unconnected to the second nodes by edges;

at an initial stage of a simulation of the additive manufacturing process:

simulating, by the computing system as part of the simulation of the additive manufacturing process, adding material to form an initial layer of the computer-modelled part on a build plate and multiple additional layers progressively added on the initial layer; and populating, by the computing system, first nodes within the initial layer and the multiple additional layers of the computer-modelled part with temperature values, such that each of the first nodes within the initial layer and the multiple additional layers has a corresponding temperature value, the first nodes within the initial layer and the multiple additional layers of the computer-modelled part being distributed according to a first density of the first nodes, wherein the computer-modelled part has no region with second nodes that have a second density lower than the first density and that are populated with temperature values while the computer-modelled part has only the initial layer and the multiple additional layers, the second density of the second nodes being lower than the first density of the first nodes;

removing, by the computing system, first nodes that are distributed through at least part of the initial layer and the multiple additional layers to form the second region that is proximate the build plate and that has the second density that is lower than the first density; and at a later stage of the simulation of the additive manufacturing process:

populating, by the computing system, the first nodes within the first region of the computer-modelled part with temperature values, such that each of the first nodes within the first region has a corresponding temperature value, the first region of the computer-modelled part having the first density of the first nodes, the first region of the computer-modelled part being proximal a surface of the computer-modelled part at which material is added to the computer-modelled part during the simulation of the additive manufacturing process, each of the first nodes within the first region of the computer-modelled part being connected to multiple other nodes with respective edges to form a first network of nodes;

populating, by the computing system, the second nodes within the second region of the computer-modelled part with temperature values, such that each of the second nodes within the second region has a corresponding temperature value, the second region of the computer-modelled part having the second density of the second nodes that is less than the first density of the first nodes in the first region of the computer-modelled part, the second region of the computer-modelled part being distal the surface of the computer-modelled part at which material is added to the computer-modelled part during the simulation of the additive manufacturing process, each of the second nodes within the second region of the computer-modelled part being connected to multiple other nodes with respective edges to form a second network of nodes;

removing, by the computing system, first nodes from part of the first region that is proximate the second region, so that the part of the first region that is proximate the second region becomes part of the second region and has the second density of nodes;

simulating, by the computing system as part of the simulation of the additive manufacturing process, adding material on the surface of the computer-modelled part to form a new layer of the computer-modelled part, the new layer of the computer-modelled part being part of the first region and having first nodes that are distributed according to the first density; and populating, by the computing system, the first nodes within the new layer of the computer-modelled part with temperature values based on temperature values of the second nodes unconnected to the first nodes by edges.

* * * * *